(12) United States Patent  (10) Patent No.: US 7,530,105 B2
Gilbert et al.  (45) Date of Patent: *May 5, 2009

(54) TACTICAL AND STRATEGIC ATTACK DETECTION AND PREDICTION

(75) Inventors: Logan Gilbert, Austin, TX (US); Robert J. Morgan, Austin, TX (US); Arthur A. Keen, Austin, TX (US)

(73) Assignee: 21st Century Technologies, Inc., Austin, TX (US)

(*) Notice: Subject to any disclaimer, the term of this patent is extended or adjusted under 35 U.S.C. 154(b) by 15 days.

This patent is subject to a terminal disclaimer.

(21) Appl. No.: 11/688,540

(22) Filed: Mar. 20, 2007

(65) Prior Publication Data
US 2007/0226796 A1    Sep. 27, 2007

Related U.S. Application Data

(60) Provisional application No. 60/784,437, filed on Mar. 21, 2006.

(51) Int. Cl.
*G06F 15/16*    (2006.01)
(52) U.S. Cl. .................. 726/22; 709/223; 709/222; 709/224; 709/227
(58) Field of Classification Search ............ None
See application file for complete search history.

(56) References Cited

U.S. PATENT DOCUMENTS 5,613,014 A    3/1997   Eshera et al.
7,068,998 B2*  6/2006   Zavidniak ............ 455/410
2002/0197978 A1  12/2002  Zavidniak
2006/0112146 A1*  5/2006  Song et al. ............ 707/200

OTHER PUBLICATIONS

International Search Report, PCT/US07/64516, Sep. 29, 2008.

* cited by examiner

*Primary Examiner*—Pramila Parthasarathy
(74) *Attorney, Agent, or Firm*—Dillon & Yudell LLP

(57) ABSTRACT

NETWAR provides a utility that enables detection of both tactical and strategic threats against an individual entity and interrelated/affiliated networks of entities. A distributed network of sensors and evaluators are utilized to detect tactical attacks against one or more entities. Events on the general network are represented as an input graph, which is searched for matches of example pattern graphs that represent tactical attacks. The search is performed using a scalable graph matching engine and an ontology that is periodically updated by a subject matter expert or analyst. NETWAR provides the functionality to determine/understand the strategic significance of the detected tactical attacks by correlating detected tactical attacks on the individual entities to identify the true motive of these attacks as a strategic attack. NETWAR also provides predictive capability to predict future entities and sub-entities that may be targeted based on evaluation of the attack data.

46 Claims, 11 Drawing Sheets

TACTICAL AND STRATEGIC ATTACK DETECTION AND PREDICTION

PRIORITY CLAIM

Benefit of priority under 35 U.S.C. §119(e) is claimed based on U.S. Provisional Application No. 60/784,437, entitled, "Method, System and Program Product for Internet Warfare," filed on Mar. 21, 2006, which disclosure is incorporated herein by reference.

RELATED APPLICATIONS

The present application is related to the following co-pending U.S. Patent Applications: U.S. patent application Ser. No. 11/367,944 filed on Mar. 4, 2006; U.S. patent application Ser. No. 11/367,943 filed on Mar. 4, 2006; U.S. patent application Ser. No. 11/539,436 filed on Oct. 6, 2006; U.S. patent application Ser. No. 11/673,816 filed on Feb. 12, 2007; and U.S. patent application Ser. No. 11/557,584 filed on Nov. 8, 2006. Relevant content of the related applications are incorporated herein by reference.

GOVERNMENT RIGHTS

This invention was made with Government support under Agreement No. FA8750-04-C-0064 with the United States Air Force and Agreement No. DAAD17-03-C-0065 with the United States Army. The U.S. Government has certain rights to this invention.

BACKGROUND OF THE INVENTION

1. Field of the Invention

The present invention relates generally to computer processing of data, and in particular to computer evaluation of network activity data. Still more particularly, the present invention relates to a method and system for performing computer evaluation of network activity data to detect attacks.

2. Description of the Related Art

Next generation cyber threats are emerging in the form of powerful Internet services and tools that automate intelligence gathering, planning, testing, and surveillance. Among these tools are "Search-Engine Hacks" and queries that can retrieve lists of router/switch/server passwords. Vulnerable to these attacks are control panels, accessible cameras, software keys, virtual private network (VPN) connection files, and certain web applications, for example. Examples of these attacks include "Titan Rain" utilized against governmental facilities and the Santy worm, which identifies vulnerable sites by searching Google for URLs containing certain application-specific strings. This generation of increasingly sophisticated and automated intelligence-driven cyber attacks, which are often coordinated across multiple domains, are difficult to defeat or even understand with current technology.

Computer Network Defense (CND) and Information Security (InfoSec) are at a great disadvantage against adversaries that mount determined attacks using these new cyber techniques. The "adversary" (e.g., attackers and/or seekers of secure/private information) dictates the manner of response to the attacks by being able to (1) choose the time and place of attack, (2) control the pace of the attack, (3) use automated tools to execute attacks, (4) obfuscate known attacks so that they are not detected, (5) use tactical open source material to understand vulnerabilities of the "victim" (i.e., the entities being attacked), and (6) use strategic open source material to understand the entities that they are attacking.

The above problem is further exacerbated by a lack of situational awareness because the defender (i.e., the person or entity trying to prevent such attacks) is unable to complete a host of required functions to prevent against the attacks. For example, the defender is typically unable to: (1) deal with overload of real-time information from security devices, (2) accurately identify attacks (both past and ongoing), (3) aggregate reliable and complete information on the networks being defended, (4) understand the motive of attacks, (5) predict future attacks, (6) determine the impact of attacks, and (7) reliably identify the attackers (e.g., the attacker's nationality, location, or IP address).

One traditional method of implementing computer defenses against attacks relies on surveillance detection as an attack predictor. Unfortunately, surveillance detection is difficult because attackers are able to perform search engine-driven surveillance, such as with Google Hacks, and avoid touching the target (victim) site. Therefore, with this surveillance detection method, the attack observables represent only about 5% of the attacker's total attack time, and this small percentage of observables are inadequate to trigger a warning, given that even benign operations on the site would generate a similar or larger percentage of observables.

Also, although conventional capabilities help detect some potential attacks, the vast number of events occurring on the computer networks (such as the Internet) are proving to be overwhelming. Delay in updating signature sets as well as the vast number (perhaps millions) of daily events have given network attackers and intruders an increasing advantage. Because of the large number of potential attack signatures, most of which are still being defined/identified, or have evolved since they were initially identified, current CND capabilities fall dramatically short of identifying the wider range of attacks that confront networks and systems daily. Further, signature-based systems experience lag time as signature databases are updated and are ineffective once a threat mutates. Clearly, greater capability is required to offset current operational shortfalls.

Additionally, even experienced operators cannot process the vast amount of information presented on a given day to the level required in order to be able to predict many of the sophisticated and morphing emerging threats. The sheer volume of data collected, combined with the speed and sophistication of the real time events may eventually contribute to a catastrophic operational failure of a network and perhaps an industry or even a country.

Thus, as is becoming more evident, there is a need for a shift in thinking from the current reactive approach to CND technology where progress is driven only in response to the attackers' innovation.

SUMMARY OF ONE EMBODIMENT

Disclosed is a method, system and computer program product for efficiently and effectively evaluating both tactical and strategic threats to protect an individual network or collection of interrelated/affiliated networks by computationally recognizing existing threats, reducing the time required to act on the information of an existing/ongoing threat, and providing predictive capability for emerging or future threats. Existing network data is sensed using multiple software/hardware sensors and forwarded to a NETWAR device. The NETWAR device is computer device that executes a Tactical and Strategic Attack Detection and Prediction (TSADaP) utility, which performs a series of functions, including: generating a NETWAR user interface for input, manipulation and control of information, data and/or results by a system analyst; representing input data as a graphical form of nodes and edges; sampling and evaluating existing network data using an underlying graph-based search engine; performing graph matching and anomaly detection within the input data; dynamically determining (information about the) strategic motive, tactical means, and tactical opportunities (MMO) of an attacker; automatically detecting and predicting attacks at strategic and tactical levels by detecting strategic actions on the Internet or other network and comprehending the MMO of attackers; predicting future attacks; and automatically accounting for evolving changes in attack models to enable detection of evolved attack methods, without requiring a full attack signature for graph comparison.

The above as well as additional objectives, features, and advantages of the present invention will become apparent in the following detailed written description.

BRIEF DESCRIPTION OF THE DRAWINGS

This invention is described in a preferred embodiment in the following description with reference to the drawings, in which like numbers represent the same or similar elements, as follows.

The embodiments of the invention are described in illustrative embodiments in the following description with reference to the figures, in which like numbers represent the same or similar elements.

DETAILED DESCRIPTION OF ILLUSTRATIVE EMBODIMENTS

Figure 1:
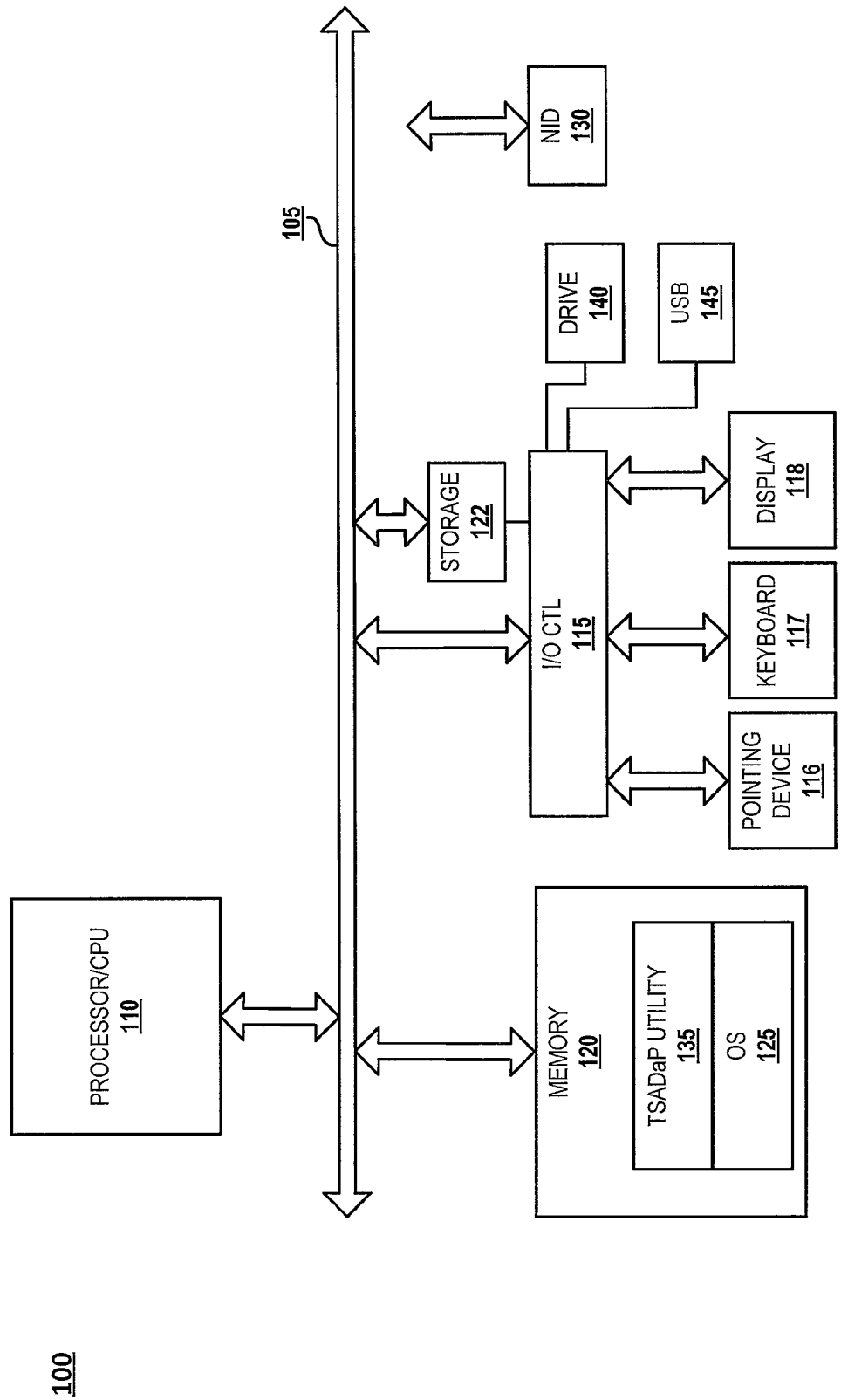
FIG. 1 is a block diagram representation of a data processing system that may be utilized as a NETWAR (Network Warfare) device to carry out the various features of the invention, in accordance with one embodiment.

The embodiments of the present invention provide a method, system and computer program product for efficiently and effectively evaluating both tactical and strategic threats to protect an individual network or collection of interrelated/affiliated networks by computationally recognizing existing threats, reducing the time required to act on the information of an existing/ongoing threat, and providing predictive capability for emerging or future threats. Existing network data is sensed using multiple software/hardware sensors and forwarded to a NETWAR device.

The NETWAR device is computer device that executes a Tactical and Strategic Attack Detection and Prediction (TS-ADaP) utility, which performs a series of functions, including: generating a NETWAR user interface for input, manipulation and control of information, data and/or results by a system analyst; representing input data as a graphical form of nodes and edges; sampling and evaluating existing network data using an underlying graph-based search engine; performing graph matching and anomaly detection within the input data; dynamically determining (information about the) strategic motive, tactical means, and tactical opportunities (MMO) of an attacker; automatically detecting and predicting attacks at strategic and tactical levels by detecting strategic actions on the Internet or other network and comprehending the MMO of attackers; predicting future attacks; and automatically accounting for evolving changes in attack models to enable detection of evolved attack methods, without requiring a full attack signature for graph comparison.

In the following detailed description of exemplary embodiments, specific exemplary embodiments by which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention.

Several acronyms are presented herein and utilized throughout the description of the embodiments. These acronyms are defined when first introduced and are to be afforded the meanings/definitions provided herein. Also, it is understood that the use of specific terminology and/or nomenclature are for example only and not meant to imply any limitations on the invention. The invention may thus be implemented with different nomenclature/terminology utilized to describe the various parameters, components, devices or utilities, without limitation.

The description of the embodiments is presented with multiple sections and subsections, delineated by corresponding headings and subheadings. The headings and subheadings are intended to improve the flow and structure of the description, but do not provide any limitations on the invention. The content (i.e., features described) within any one section may be extended into (or overlap with content of) other sections. Further, functional features provided within specific sections may be practiced individually or in combination with other features provided within other sections.

A. NETWAR Device—Hardware and Software Components

Generally, within the following descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

The various computational features of the described embodiment of the invention are provided via some type/form of data processing device, which has a mechanism for receiving the network data and the TSADaP utility for analyzing (and/or manipulating) the data according to the methodology described hereinafter. In one embodiment, a specific NETWAR device is provided, which comprises hardware and software/firmware components that enable the features of TSADaP utility based on (1) received network data/information, (2) pre-defined and/or newly defined metrics, (3) one or more example pattern graphs; and/or (4) other user-provided inputs. As further illustrated within FIG. 1 and described below, the NETWAR device is implemented as a data processing system, which executes the TSADaP utility that provides the specific tactical and strategic attack detection and prediction functions described herein.

Referring now to FIG. 1, there is depicted a block diagram representation of a data processing system that may be utilized as the NETWAR device, in accordance with an illustrative embodiment of the present invention. As shown, data processing system (DPS) 100 comprises one or more processors or central processing units (CPU) 110 connected to memory 120 via system interconnect/bus 105. Also connected to system bus 105 is I/O controller 115, which provides connectivity and control for input devices, of which pointing device (or mouse) 116 and keyboard 117 are shown, and output device, of which display 118 is shown. Additionally, a multimedia drive 140 (e.g., CDRW or DVD drive) and USB (universal serial bus) port 145 are illustrated, coupled to I/O controller. Drive 140 and USB port 145 may operate as both input and output mechanisms. DPS 100 also comprises storage 122, within which data utilized to generate the input graph, the input graph itself, and/or the pattern graph (described below) may be stored.

DPS 100 is also illustrated with a network interface device (NID) 130 with which DPS 100 connects to another computer device or computer network. NID 130 may comprise a modem and/or a network adapter, for example, depending on the type of network and connection method to the network. It is however understood that application of the various processes of the invention may occur within a DPS 100 that is not connected to an external network, but receives the input data (e.g., network interaction graph and/or social network input graph) via some other input means, such as a CD/DVD medium within multimedia drive 140, a thumb/flash drive inserted in USB port 145, user input via keyboard 117, or other input mechanisms/methods.

Those of ordinary skill in the art will appreciate that the hardware depicted in FIG. 1 is a basic illustration of a data processing system (being utilized as a NETWAR device) and may vary. Thus, the depicted example is not meant to imply architectural limitations with respect to the present invention.

1. TSADaP Utility

Notably, in addition to the above described hardware components of DPS 100, various features of the invention are provided as software/firmware code stored within memory 120 or other storage (e.g., storage 122) and executed by CPU 110. Thus, located within memory 120 and executed on CPU 110 are a number of software components, including operating system (OS) 125 (e.g., Microsoft Windows®, a trademark of Microsoft Corp, or GNU®/Linux®, registered trademarks of the Free Software Foundation and The Linux Mark Institute) and software applications, of which TSADaP utility 135 is shown. In actual implementation, TSADaP utility 135 may be loaded on and executed by any existing computer system to provide real-time (or analyst-directed) analyses of an input of network data to provide network attack detection and prediction features, as further described below. In one embodiment, the network data may already be represented as a network graph, while in another embodiment, the sensed network data is converted to a network (input) graph by functional components of TSADaP utility 135. TSADaP utility 135 may also include several sub-utilities for completing the entire range of functions described herein, including those functions related to performing scalable graph matching, described below.

CPU 110 executes TSADaP utility 135 as well as OS 125, which supports the execution of TSADaP utility 135. In the illustrative embodiment, several graphical user interfaces (GUI) and other user interfaces are provided by TSADaP utility 135 and supported by the OS 125 to enable user interaction with, or manipulation of, the parameters utilized during processing by TSADaP utility 135. These GUIs are collectively referred to as a NETWAR user interface (NUI) or "GNET".

For simplicity, the collective body of code that enables these various features is referred to herein as TSADaP utility 135. Among the software code/instructions provided by TSADaP utility 135 are: (a) code for enabling tactical network attack detection, including code for matching known target graphs to an input graph; (b) code for enabling strategic network attack detection based on known relationships/interconnections/affiliations between entities within an expanded network; (c) code for displaying a NETWAR console and enabling user setup, interaction and/or manipulation of TSADaP processing; (d) code for predicting future tactical and strategic attacks on the network; and (e) code for generating and displaying the output of the TSADaP analysis in user-understandable format. According to the illustrative embodiment, when CPU 110 executes TSADaP utility 135, DPS 100 completes functional processes provided by the above mentioned code segments as well as other functional processes supported by TSADaP utility and/or utilities provided within NETWAR.

As will be described in greater detail below, execution of TSADaP utility provides an innovative approach to the problem of strategic network attacks (and/or reconnaissance) by first identifying tactical network attacks that may or may not touch the actual network site being attacked. In one embodiment, information about the strategic motive, tactical means, and tactical opportunities (MMO) of the potential attacker is deduced by detecting one or more strategic actions, such as internet searches, perusal of web sites, and aggregation of information. Once an MMO of reconnaissance and attack actions/activities is determined, the MMO is fingerprinted. Multiple such MMOs are created based on observed, known, or deduced attack and reconnaissance patterns. TSADaP utility taps into the functionality of automated reconnaissance tools, including open access/free tools, such as Google® or Yahoo Search, or NETWAR proprietary tools, designed specifically to support the NETWAR platform. Using these reconnaissance tools, TSADaP utility is able to identify information vulnerabilities. TSADaP utility then utilizes other available Internet tools to observe the intelligence gathering, planning, testing, and collaboration activities, which may represent a significant portion (e.g., 95%) of the attacker's effort.

For simplicity in the following description of the embodiments of the invention, the combination of (a) the NETWAR device on which TSADaP functionality is implemented and (b) the functions provided by executing TSADaP utility and other associated program modules or utilities is referred to herein as NETWAR. A more comprehensive description of NETWAR is described below along with the illustrations of FIGS. 2-11.

B. NETWAR and Graph Pattern Matching

NETWAR enables detection of both tactical and strategic threats against an individual entity and interrelated/affiliated networks of entities. A distributed network of sensors and evaluators are utilized to detect tactical attacks against one or more entities. Events on the general network are represented as an input graph, which is searched for matches of example pattern graphs that represent tactical attacks. The search is performed using a scalable graph matching engine and an ontology that is periodically updated by a subject matter expert and/or analyst. NETWAR provides the functionality to determine/understand the strategic significance of the detected tactical attacks by correlating detected tactical attacks on the individual entities and matching strategic attack graph patterns against an input graph representing the relationships/affiliations among these entities and the tactical attacks the entities have been victim to. Matches on these patterns identify the motive of strategic attacks, which is used to predict future attacks as well as the entities and sub-entities that may be targeted.

Conventional network defense practices focus on deploying sensors to detect and in some cases prevent individual actions that may be part of a tactical attack. As utilized herein, a tactical attack consists of many individual actions which may be malicious or legitimate. A sophisticated set of algorithms (i.e., TSADaP utility) within NETWAR uses existing sensors and collected data to cue analysts and operators to events that have qualified as attacks in the past, and also represent high probabilities of ongoing or future attacks that are similar to a known library (ontology) of attack patterns. NETWAR enables operators to detect, analyze, and predict attacks. NETWAR comprises the capability to leverage existing network sensors and collected data to not only rapidly detect network attacks but also predict individual and coordinated attacks as well as detect surveillance conducted against networks and information databases or sources.

NETWAR provides the ability to detect and predict attacks, reflecting a true "understanding" of attacks. NETWAR also provides an understanding of coordinated attacks in that NETWAR supports the following functions: (1) attack detection, (2) attack classification, (3) attack state detection such as success, failure, or ongoing, and (4) predictions on the motive and most likely courses of action of an ongoing attack. Further, with the implementation of TSADaP utility, much of the workload of NETWAR is automated (computer-based). Further, in addition to making operations more efficient, NETWAR also makes the operations more effective because of (1) NETWAR's capability of detecting and/or identifying adapting threats, (2) NETWAR's ability to work quickly through voluminous data sets, and (3) NETWAR's ability to predict attack. When implemented within a dataset (input data), NETWAR is able to detect and provide analysis of attacks and intrusions in near real time, thus reducing the load on the analysts.

NETWAR may be utilized for both private and governmental purposes. For example, in one embodiment, contractor and government entities (CAGE) may share information by reporting information about attacks, including detected exploits, corresponding vulnerabilities, attacked network function, time of attack, and any available information on attackers, such as clock skews. This information is entered into NETWAR, and the TSADaP utility is able to analyze and determine potential attacks on the government entity, even if the attack is coordinated or directed at one of the contractors and/or suppliers. This ability to extrapolate beyond the actual network of the entity being attacked enables detection of strategic attacks in a supply chain and other domains (e.g., affiliated entities in the same or related business/process), where the entity being attacked has vulnerabilities outside of its own network (e.g., its suppliers).

In one embodiment, NETWAR implements the functionality of Social Network Analysis (SNA), SNA-based anomaly detection, graph pattern matching, graph augmentation, group detection, and statistical analysis. The application of these methodologies within NETWAR is described below. Further description of these methodologies are provided within the co-pending patent applications, referenced above and previously incorporated herein by reference.

1. eGMIDS and Tactical Attacks

The enhanced graph-based intrusion detection system (eGMIDS) applies graph pattern matching, anomaly detection using Social Network Analysis (SNA) metrics, and statistical analysis to identify attack patterns in an input graph. The input graph is generated as a result of eGMIDS fusing network topology and the stream of sensor events received from the network sensors. As described in the co-pending application, eGMIDS uses an ontology that relates sensor event types, attacker actions, vulnerabilities, and coordinated attack templates. For example, eGMIDS detects "phishing" attacks by correlating suspicious actions from external web servers to internal hosts against emails that contain the address of the external server. Thus, eGMIDS provides a framework within NETWAR for analyzing tactical attacks.

One embodiment of the described approach requires conducting an investigation on the properties of the metrics of interest, and correctly implementing algorithms to take advantage of these properties. This approach has the potential for reducing, by several orders of magnitude, the efficiency of calculating SNA metrics that have the ability of distinguishing suspicious and benign behavior.

2. Strategic Attacks

In addition to tactical attacks, NETWAR further provides a methodology for detecting and predicting strategic attacks. Table I below illustrates some differences between a tactical attack and a strategic attack, as those terms are utilized within the description of embodiments.

TABLE I

| Characteristic | Strategic Attack | Tactical Attack |
| --- | --- | --- |
| Behavior | Planned and controlled. | Random and opportunistic. |
| Opportunity | Open source information. | Vulnerabilities and ignorance. |
| Motive | Information assets including specifications, | Confidentiality, integrity, availability of switches, |

TABLE I-continued

| Characteristic | Strategic Attack | Tactical Attack |
|---|---|---|
| | technologies, plans, capabilities, procedures, and guidelines to gain strategic advantage. | routers, computers, files, databases, applications, and operating systems for prestige or financial reward. |
| Means | Information fusion, search engines, tactical attacks, human intelligence. | Malware, exploits, hackers, surrogates, insider threat, chat rooms. |
| Threat | State sponsored, organized crime, competitors. | Professional hackers, script kiddies, insiders. |
| Defense | NETWAR | NETWAR/eGMIDS |

As shown within Table I, NETWAR enables defense against strategic threats. NETWAR incorporates functionality of eGMIDS to enable detection of tactical attacks, then correlates the detected tactical attacks within a context to determine whether the tactical attacks are indicative of a strategic attack on a different entity or more expansive entity relationship. As also shown by the table, one key differentiator between tactical and strategic attacks is motive. That is, tactical attacks target network assets for prestige or financial reward, whereas a strategic attack is the coordination of multiple tactical attacks against multiple target networks for strategic advantage. The targets of tactical attacks may include switches, routers, computers, data files, and operating systems, and tactical attacks are random and opportunistic, taking advantage of network vulnerabilities and user ignorance. Strategic attacks target a higher level process and are intelligence driven and carefully planned and orchestrated. For example, strategic attacks may include infiltrating strategic infrastructure, e.g., telecommunications infrastructure, and aggregating information in specific technology areas, e.g., stealth technology.

The ability to understand strategic attacks requires an understanding of: (1) the business functions and processes supported by individual networks; (2) the business relationships between networks; and (3) sharing of tactical attack data among contractors, suppliers, and target entities. The information gleaned by threats on these business relationships is used to guide and direct strategic attacks.

3. Graph Analysis Engine (GAE) and Data Fusion

According to one embodiment, a graph analysis engine (GAE) developed under a Graph-based Intrusion Detection System (GMIDS) or enhanced GMIDS (eGMIDS) may be utilized to correlate events from multiple sensors in order to understand tactical attacks, including detecting ongoing tactical attacks, performing forensics on completed tactical attacks, and predicting likely conclusions to ongoing attacks. The (GAE) is utilized as a common building block for NETWAR.

Figure 2:
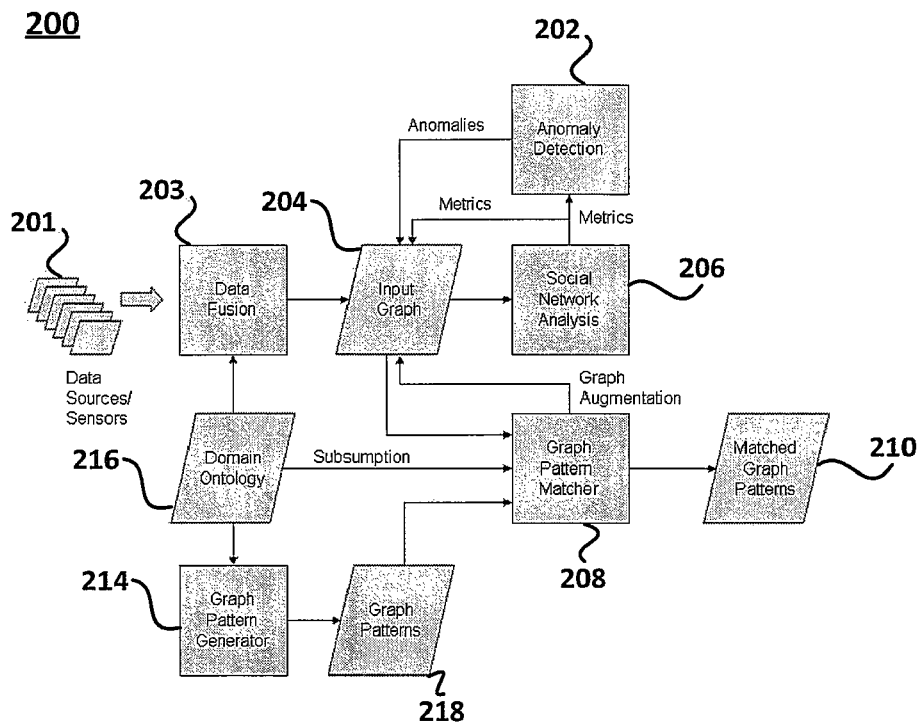
FIG. 2 depicts an example graph analysis architecture utilized within the NETWAR according to one embodiment of the invention.

FIG. 2 depicts a GAE architecture utilized within NETWAR, in one embodiment. The GAE 200 uses a domain ontology to (1) map sensor events to probable actions, (2) define threat patterns, and (3) provide ontological services to the pattern matcher (e.g., subsumption). Within GAE 200, input data received from data sources/sensors 201 are inputted to data fusion function 203. The data fusion function 203 uses the domain ontology 216 to fuse the input data into an Attributed Relational Graph (ARG), which is illustrated as input graph 204. Input graph 204 is provided to graph pattern matcher 208 and Social Network Analysis (SNA) function 206. Graph Pattern Generator 214 also uses the domain ontology 216 to generate graph patterns 212, which are also inputted to Graph Pattern Matcher 208. The Graph Pattern Matcher 208 matches the graph patterns against input graph 204. The SNA function 206 computes social network metrics on the input graph 204 and feeds the metrics back to the input graph 204 and to anomaly detection function 202. Anomaly detection function 202 performs statistical anomaly detection on the input graph using social network metrics, and anomaly detection function 202 identifies anomalies and inserts alerts into the input graph 204 when the anomalies are detected.

NETWAR uses a distributed network of GAEs to understand tactical attacks against target entities and to understand the strategic significance of these tactical attacks. NETWAR understands strategic attacks by correlating detected tactical attacks on target entities by matching strategic attack graph patterns against an input graph representing the relationships among target entities and the tactical attacks they have been victim to. Matches on these patterns will identify the motive of strategic attacks that are used to predict future entities that will be targeted.

Graph patterns may include graph augmentation directives which, when matched, trigger modifications to the original input graph resulting in the addition, modification or removal of nodes and edges. Graph patterns may contain matches for anomalies as well as constraints on matching that refer to attributes on the ARG that include social network metrics or time. Graph Pattern Matcher 208 generates matched graph patterns 210 as outputs. In one embodiment, Graph Pattern Matcher 208 utilizes a technique referred to as subgraph isomorphism.

The GAEs of NETWAR also supports identification of suspicious activity patterns through Social Network Analysis (SNA). SNA is also described in co-pending application which has been incorporated herein by reference. SNA is a graph-based technique that takes a different approach than Subgraph Isomorphism. For example, with the intelligence analyst, SNA may be used for detecting abnormal patterns of social interaction. GAEs provide tools that produce both static and time-dependent analyses of social networks. The GAE supports characterizing the development of graph structure over time. GAE implementation in NETWAR also tackles the tasks of group detection and anomaly detection using SNA metrics.

4. Graph Matching

Figure 3:
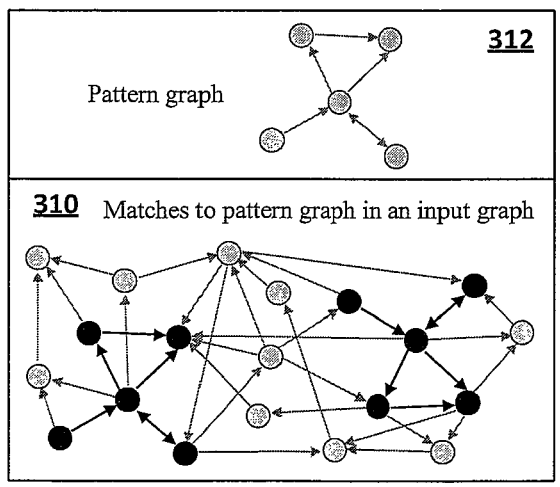
FIG. 3 illustrates a sample pattern graph matched within an input graph, in accordance with the graph matching features of one embodiment of the invention.

Subgraph isomorphism or graph matching finds matches to a pattern graph. Graph matching finds subsets of the input graph that are "equivalent to" the pattern graph. FIG. 3 illustrates graph pattern matching whereby a sample pattern graph 312 is matched within an input graph 310 in which the matches are highlighted. Graph matching and features associated therewith have been described in the co-pending patent applications, whose content have been incorporated herein by reference. NETWAR applies graph matching to improve current abilities for the detection of deliberate, tactical and strategic network attacks. NETWAR represents network activity as graphs since the majority of security log data is highly structured and easily represented as graphs, as is illustrated by FIG. 4, described below.

Figure 4:
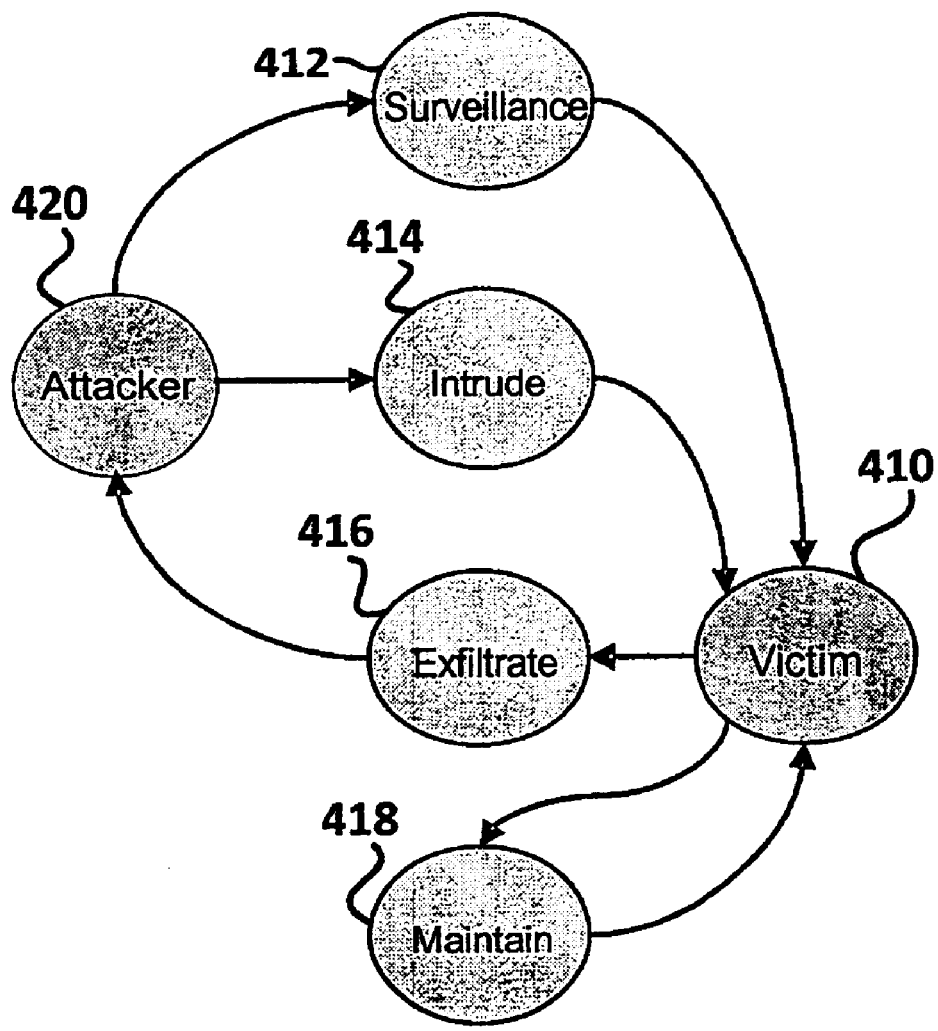
FIG. 4 illustrates the generation of a graph pattern for an example intruder detection scenario, in accordance with one embodiment of the invention.

FIG. 4 provides an example of a graph pattern that may be generated in response to an example attack scenario. Within the attack scenario, attacker 420 uses TCP/IP port scans on a host victim's system in an effort to discover a means by which the attacker 420 can compromise that system. Once enough information has been gathered, the attacker 420 proceeds to intrude on the victim's system 410, by virtue of having discovered the victim's e-mail password. At this point the attacker 410 has access to the user's e-mail and can exfiltrate all of the victim's e-mails by forwarding all of the victim's received e-mails to the attacker 420. In order to cover his/her tracks, the attacker 420 performs maintenance operations to hide their intrusion onto the victim's system and their constant exfiltration of information.

This pattern of attack may then be represented generically in the form of a graph as shown in FIG. 4. The TCP/IP port scans are represented by the Surveillance node 412. The attacker 420 attempts to use the victim's (410) e-mail password is represented by the Intrude node 414, and the subsequent forwarding of e-mails represented by the Exfiltrate node 416. Not that the graph is a generic representation of the attack. The specific form of the exfiltration (forwarding the e-mails) is not specified, just the act of exfiltration (416), which could include keystroke loggers, remote access via Trojans, etc. The generated Graph Pattern 400 is used by NETWAR to discover all attacks of a similar nature, independent of the mechanisms used on a particular system.

5. Inexact Matching Social Network Analysis (SNA) with GAE

According to the embodiments, an important extension to graph matching supported by the GAEs of NETWAR is Inexact Matching. Inexact matching is further described in co-pending patent application, which has been incorporated herein by reference. With inexact matching, analysts are able to define a sensitivity cutoff (e.g. 80%) for the quality of matches that the analyst wishes to be informed about. Inexact matching is utilized within the NETWAR platform to: (1) solve problems of missing data, (2) identify attack variants, (3) identify attacks that have not succeeded, and (4) predict the likely outcome of attacks. In performing graph matching functions with NETWAR, analysts may never have a perfect view of all activity. By implementing inexact matching, NETWAR enables detection of threats, even when some portion of the threat signature (activity) is hidden.

With this embodiment of NETWAR, while not all the information about preparations for an attack may be present, often enough signs are visible that an incomplete picture can still be constructed from the provided data. Additionally, inexact matching within NETWAR enables the analyst to find variations on earlier attack strategies. Typically, the overall plan structure of threat groups typically remains the same. With inexact matching, even when the attacker has implemented a variant of a previous attack strategy, NETWAR is still able to identify a given portion of an attack plan structure and identify the attacker and detect or predict the activities. In one embodiment, inexact matching insulates NETWAR platform from analyst error(s), particularly where some aspects of the pattern may simply be defined incorrectly, but the remaining aspects are valid. These remaining aspects may then be matched within the input graph to the degree of sensitivity pre-defined by NETWAR or analyst input.

6. Partial Matches and Prediction

When performing matching within NETWAR, a partial match may indicate (1) an unsuccessful attack, (2) an ongoing attacks, and/or (3) an attack variant. If the temporal constraints indicate that the missing observables should occur after those that have already been observed, TSADaP utility deduces that the partial match indicates a failed attack or an ongoing attack. Analysis of vulnerabilities of the attacked host would then indicate a failed attack if the attacked host did not have the vulnerabilities being exploited by attack steps. In one embodiment, NETWAR utilizes partial matches to predict the likely outcomes of ongoing attacks. If the predicted attack steps in the attack pattern are not observed over time, this would also lead to a conclusion that the attack failed. As observables stream in, more evidence is collected in the partial matches leading to increasing accuracy of prediction, but decreasing time for the computer analyst to react to the attack.

In another embodiment, partially matched patterns that have missing observables that are not temporally correlated are utilized to identify new attack variants. This analysis is made because attackers reuse portions of existing attacks. The partially matched patterns can also be correlated against anomaly alerts to further gather evidence for an attack variant. New attack variants are identified, outputted to the analyst, and these new variants drive updates to the domain ontology.

7. Anomaly Detection and SNA Metrics

Graph pattern matching, as described above, depends on a human analyst to define rules or events that are significant. Anomaly detection, however, classifies patterns of activity and learns automatically what constitutes normal interaction and what types of patterns are anomalous. Anomaly detection is performed using Social Network Analysis (SNA), a methodology for examining networks of human interactions. SNA is performed in terms of metrics. SNA metrics characterize the topology of a graph (or regions of a graph), with different metrics quantifying different salient aspects of topology. SNA can be applied to characterize activity within an input graph as normal or abnormal, based on the values of the SNA metrics computed on the activity. Using anomaly detection, the GAE of NETWAR is able to report anomalous activity that the analyst may not have expected or known to look for. As a result, the GAE is able to detect potential problems without having exact threat definitions beforehand.

C. Data Fusion and Strategic Attack Detection

Figure 6:
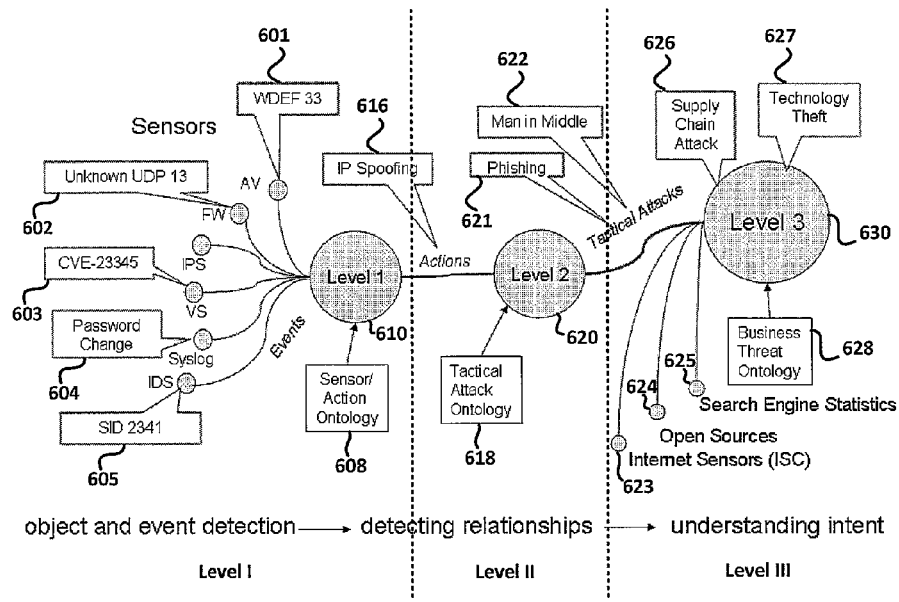
FIG. 6 is a multi-level fusion diagram illustrating the operations at the two lower levels fusion and the level 3 fusion at which strategic detection via NETWAR occurs, according to one embodiment of the invention.

The NETWAR architecture is a distributed arrangement of GAEs designed to achieve different levels of data fusion (See FIG. 6). According to one embodiment, GAEs are linked together in a distributed tree-like architecture where the outputs of one layer of GAEs are connected to the input of the next layer in a recursive structure to achieve different levels of information/data fusion. From a data fusion perspective, and in the context of NETWAR, Level I fusion involves the integration of sensor events, Level II fusion involved tactical attack detection and prediction, and Level III fusion involves strategic attack detection and prediction. Also, Level I fusion 610 provides object and event detection, Level II fusion 620 provides relationship detection, and Level III fusion 630 provides an understanding of intent.

1. Levels I and II Data Fusion

Level I data fusion is the integration and correlation of these sensor events into a common representation, known as an attributed relational graph (ARG). The correlation is driven by an event and action ontology. The GAE searches this information to identify patterns that would indicate that attacks have occurred. These level I fusion systems are called Security Information Managers (SIM) or Security Event Managers (SEM).

As shown by FIG. 6, user level activity/events (601-605) is classified at Level I fusion 610, and each activity is monitored by a corresponding sensor type. The network contains sensors that monitor activities (events) in the network infrastructure that may indicate the presence of malware or malicious activity. These sensors include Intrusion Detection Systems (IDS), Intrusion Prevention/Protection Systems (IPS), Firewalls (FW), Packet Sniffers, Anti Virus (AV), vulnerability scanners (VS), and Anti Spyware (AS). Additional sensors may also be provided for tracking, web logs, system logs, and various forms of anti malware technology. These sensors detect issues that match patterns and perform actions such as logging the issue, alerting, or applying corrective actions. Level I fusion 610 also receives sensor/action ontology 608.

The sensors raise events when certain actions are detected. The detected actions could be legitimate actions, such as creating a user account, or malicious actions, such as the presence of a packet that has been deliberately crafted to cause a buffer overflow condition. In one embodiment, these sensors may generate substantial quantities of security events. For example, an intrusion detection system can generate over 10,000 events per hour. A method for utilization and deployment of sensors and a description of types of sensors that may be utilized to detect network activity is provided within the co-pending applications, which have been incorporated herein by reference.

Level II fusion determines relationships among the correlated events by looking for patterns in events from multiple sensors. This is done via pattern matching using rules, graph patterns, or scripts. Level II fusion will tell you that a "man-in-the-middle attack" has occurred or that a "Phishing attack" has occurred. A partial pattern match at Level II could indicate an unsuccessful attack or an attack that is in progress. Temporal constraints on partial match patterns can be used to predict the next actions of the attacker. Level II fusion 620 tells you what kind of attack has occurred, but does not tell you what the intent of the attack is.

Returning to FIG. 6, Level II fusion 620 covers tactical attack analysis, and operates with tactical attack ontology 618. The tactical attacks include phishing attacks 622 and man in the middle attacks 622 (among others). In one embodiment, tactical attack understanding is achieved in the second layer of GAEs performing Level II fusion 620. In Level II fusion 620, the domain ontology of the GAE contains a model of security sensor events related to possible actions performed by a threat. Notably, a security event may correspond to multiple actions and the correlation of multiple events into an attack pattern determines what the event means. For example, if a packet sniffer matches the string "passwd," this match could mean an attempt to retrieve a UNIX password file or an attempt to change a UNIX password. The domain ontology also relates malicious actions to vulnerabilities and vulnerabilities to system configurations.

Thus, Level 2 GAEs are able to determine whether a malicious action could succeed by cross-referencing the vulnerabilities of the configuration being attacked. The Level II ontology also contains coordinated attack definitions that consist of actions. These attack definitions are translated to attack graph patterns that the graph matching engine applies to the input graph. The generated patterns contain temporal constraints between actions that model required action sequences detected by the observed events.

2. Level III Fusion: Detecting Strategic Attacks

Level III fusion is provided by NETWAR and provides knowledge of the intent of an attack for strategic network defense. Level III fusion in NETWAR combines the detected tactical attacks, business threat ontology, search engine statistics, open source data, and internet sensors, e.g., the internet storm center and internet traffic center, to identify and predict strategic attacks. As illustrated by FIG. 6. Level III fusion 630 provides for strategic attack detection and prediction, including supply chain attacks 626 and technology theft 627 among others. Among the sources utilized to provide the input for Level III fusion are Internet sensors (ISC) 623, open sources 624, and search engine statistics 625. Level III fusion 630 uses business threat ontology 628.

The Level III fusion's GAEs are utilized to understand strategic attacks. The domain ontology in Level III GAEs may contain (1) descriptions of specifically identified target entities (e.g., contractor and government entity—CAGE descriptions); (2) interdependencies between the individual target entities, such as supply chain dependencies; (3) business functions and services of the target entities; (4) relationships between network assets and business assets of the target entities, including strategic information, functions, and services; and (5) information about strategic threats and the threat's likely motives. The Level III GAE input graph is constructed using detected and predicted tactical attacks from Level II and the network of relationships among entities and computer networks in the Level III domain ontology.

Figure 7:
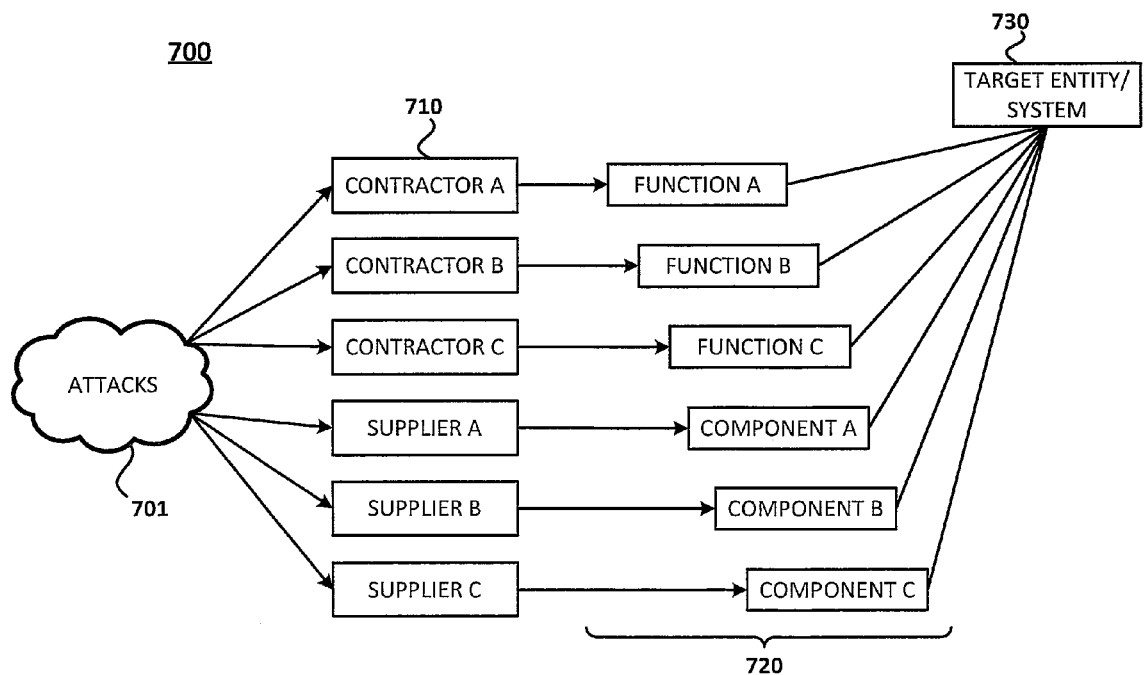
FIG. 7 is an example supply chain network for an attack target, illustrating the vulnerability of the target to strategic attacks, which may be identified using NETWAR, in accordance with one embodiment of the invention.
Figure 8:
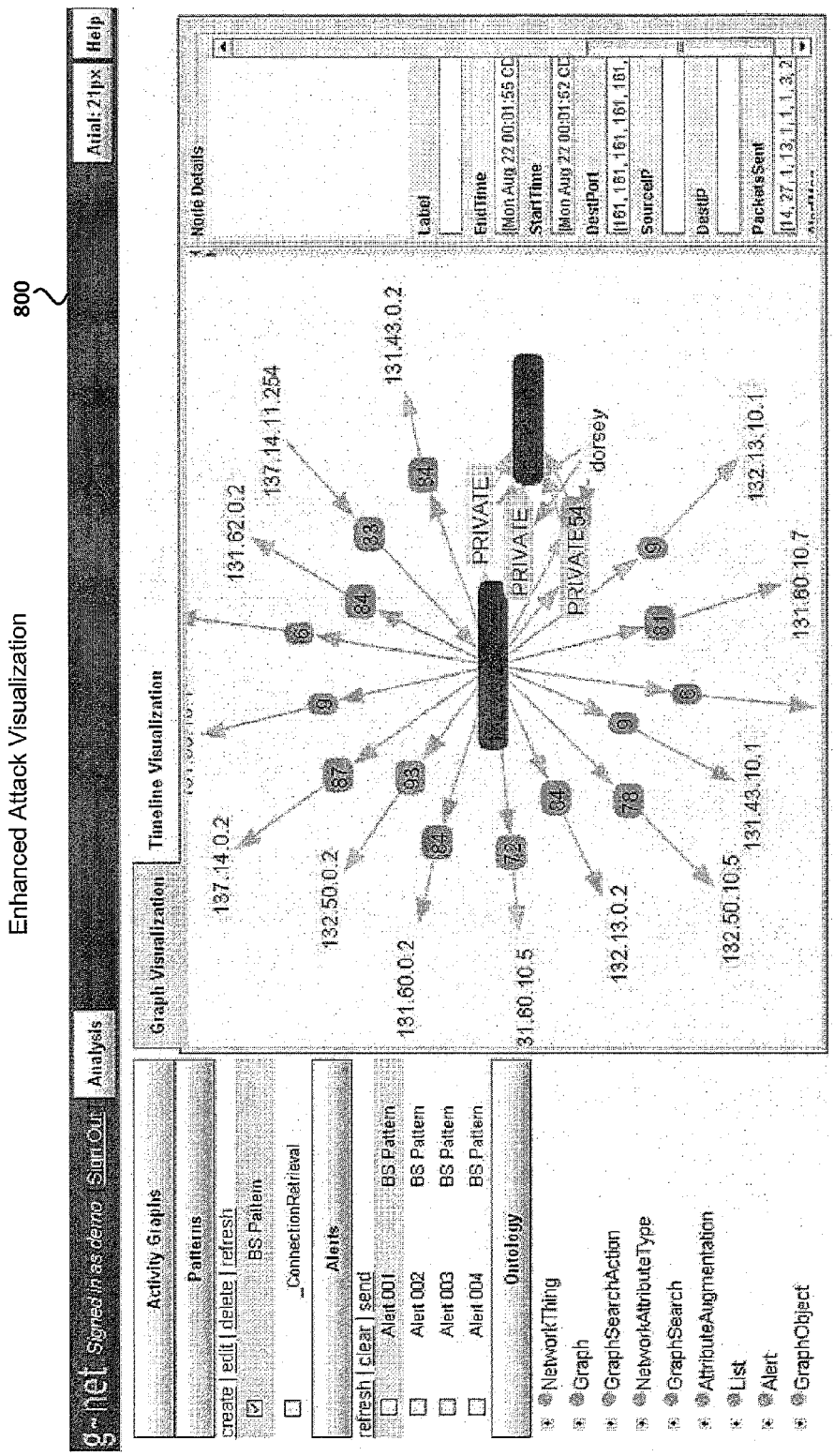
FIG. 8 is an example of a NETWAR graphical user interface (NUI) by which a user/analyst may interact with and/or control NETWAR functions, according to an illustrative embodiment of the invention.

NETWAR recognizes and factors in knowledge of the greater security risks due to the availability of open source material and powerful search engines, which enables attackers to understand the defense infrastructure so that the attackers are able to mount coordinated attacks to effect logistics, access confidential information, and negatively affect (e.g., delay development of) strategic technologies. For example, in the weapons industry, it is relatively easy to find out who makes a weapon system, where it is made, who makes the subcomponents, contract size, contract purpose, weapon systems capabilities, where weapon systems are deployed, the logistic support requirements for a weapon system, the software used at facilities, the software architectures used, and even the names and addresses of personnel at facilities. The information may be publicly available or secure information that is obtained via a breach the respective correlated node. FIG. 7 provides an example of the supply chain relationships for a target system 730, which supply chain includes numerous independent suppliers (or subcontractors) 710, each of which generates/supplies a component product 720 (e.g., physical part or knowledge/know-how) that is essential to the development of the target system 730. More generally, the scenario represents a single target system (730) with multiple interconnected/affiliated entities (710), connected via some function (720) important to at least the target system (730).

An astute attacker, desirous of attacking the development schedule of the target system 730 could simply break the supply chain by attacking one or more of the suppliers 710. Thus, without attacking the end target (730) directly, the attacker could still accomplish the desired goal of delaying or preventing the development of the target system 730. Unlike conventional security tools, which would focus on detecting and defending attacks solely at an individual network level (i.e. at the individual supplier/sub-contractor network), NETWAR provides a solution for identifying these tactical attacks, compiling relevant context information, and then determining the true attack intent (i.e., the strategic attack on the target system 730).

The Level III strategic threat patterns include patterns for: (1) supply chain availability attacks; (2) industrial espionage focused on exfiltration of information about specific technologies, for example stealth; (3) strategic infiltration of an infrastructure to be leveraged in the future, for example, military networks or networks supporting utilities. These strategic attack graphs are used to correlate attacks against the different entities supporting the target entity. Predictive capabilities focus on the penetration of the tactical attacks. For example, if supporting entities that support development of a particular technology have been victims of data exfiltration attacks, one can predict that the rest of the supporting entities that supply or support that technology will be attacked. This prediction would also apply to infrastructure infiltration attacks.

D. Scalable Graph Analysis Tool and Ontology Generation

In one embodiment, NETWAR integrates features of a graph search technology (or graph analysis tool or engine), which adds a level of scalability, such that NETWAR platform is able to dynamically scale to large databases. The graph analysis tool provides a three-order magnitude graph search performance increase and is able to process graphs that are three-orders of magnitude larger than conventionally processed in substantially little time. Using the graph analysis tool enables the NETWAR platform to be utilized to search for strategic attack interactively across huge data sets, in the Terabytes region within milliseconds.

With this graph analysis tool running in the background, a clear separation of threat semantics and graph search for threats is provided. This clear separation of graph search from the interpretation of graph search results enables achievement of significantly higher performance. Additionally, the graph analysis tool further increases the graph search performance by allowing the semantic processing (inference) functions of the TSADaP utility (or of NETWAR) to handle and evaluate partial matches. In one embodiment, as described below, the graph analysis tool utilized is Wolverine™.

Thus, in addition to the TSADaP utility 135 and in order to support scalability within the processing of TSADaP utility, NETWAR comprises several additional functional components, including:

(1) A library of tactical and strategic threat patterns for use by threat analysts;
(2) A scalable database architecture for managing terabytes of data;
(3) A highly usable thin client user interface based on usability analysis, the Cognitive Task Analysis (CTA) of threat analysts, and usability requirements;
(4) The ability to publish forensic analysis;
(5) The ability to publish indications and warnings;
(6) Scalable graph search capabilities for strategic attack detection; and
(7) A training interface.

Figure 9:
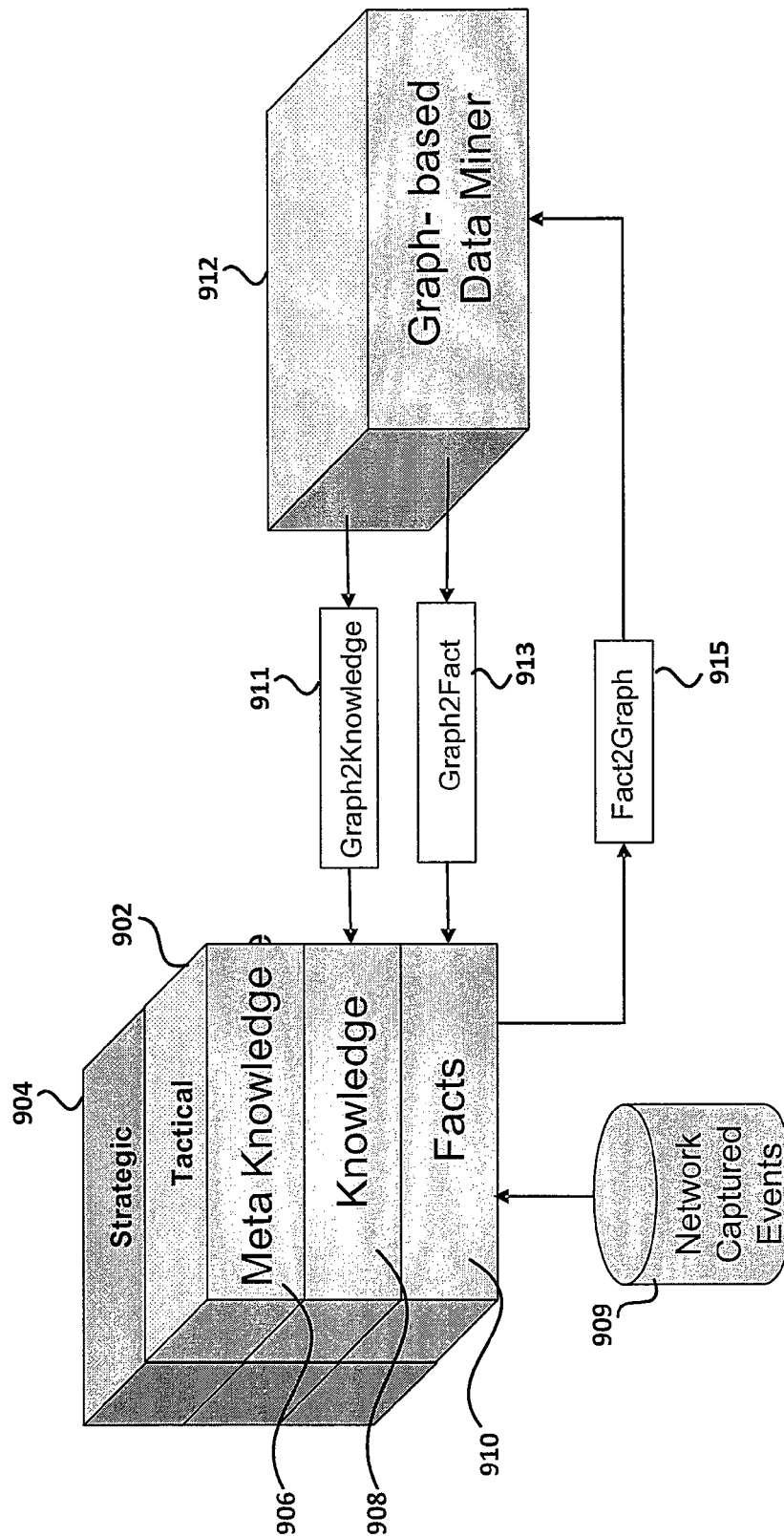
FIG. 9 is a block diagram representation of the exchange of knowledge and data between detected events an a graph-based data miner, in accordance with one embodiment of the invention.

Two different methodologies are provided for implementing NETWAR, the first of which utilizes a standard graph-based data miner (search engine) to complete standard pattern matches. FIG. 9 illustrates the first of these two embodiments. In the first embodiment, FIG. 9, cyber network events 909 are fed into a database of information (ontology), which database separates the events into meta knowledge 906, knowledge 908, and facts 910. The database is further divided into tactical ontology 902 and strategic ontology 904. A graph based data miner 912 is provided, which feeds two types of data to the database, namely graph2knowledge data 911 and graph2fact data 913. The database, in turn, provides fact2graph data 915 to the graph-based data miner 912. The graph-based data miner 912 is applicable for smaller non-scalable input databases, since the data miner 912 provides limited supports for the scalability required for large amounts of data which may be continually generated from a network being monitored in real time.

The above implementation of NETWAR utilizes an in-memory graph search function. This implementation of NETWAR provides a display architecture, which assumes that the set of all graph elements is known and available. However, efficient operation of NETWAR when monitoring a network in real time and/or evaluating a large amount of input data requires NETWAR provide a scalable database architecture for managing large amounts of data (e.g., terabytes) at a time.

In another embodiment, the in-memory graph search function is replaced or supported by the database graph search functionality of a scalable graph analysis tool, such as Wolverine™. With this embodiment, the NETWAR graph display architecture described above is replaced with one that supports retrieval of graph elements directly from the database. This function is required because, with large datasets, the user (e.g., analyst) is typically viewing only a sample of the total available data at any one time (on in any one view). With this focused view provided, the user (or analyst) will frequently desire the capability to traverse the frontier of the current view, which will require direct queries to the graph in the underlying database. One additional benefit of implementing this embodiment is that other asynchronous view augmentations, including real-time traffic updates, are more easily supported.

NETWAR implementation with this scalable graph analysis tool (e.g., Wolverine™) replacing the memory-based graph-based data miner, adds more scalability to NETWAR, and removes any unforeseen constraints on the size and complexity of the network events repository. NETWAR is thus able to support a repository collecting network data, which continues to grow. For example, network data may grow at a rate of over 30 GB per day, consuming information on roughly 10 thousand events and over 30 million unique TCP/IP connections. This scalability enables NETWAR to scale its repository to support queries in the tens to hundreds of terabytes (e.g., 20 TB) of data, as efficiently as possible. In one embodiment, NETWAR platform provides storage-intensive indices for commonly referenced data fields including IP address and event type attributes.

Figure 10:
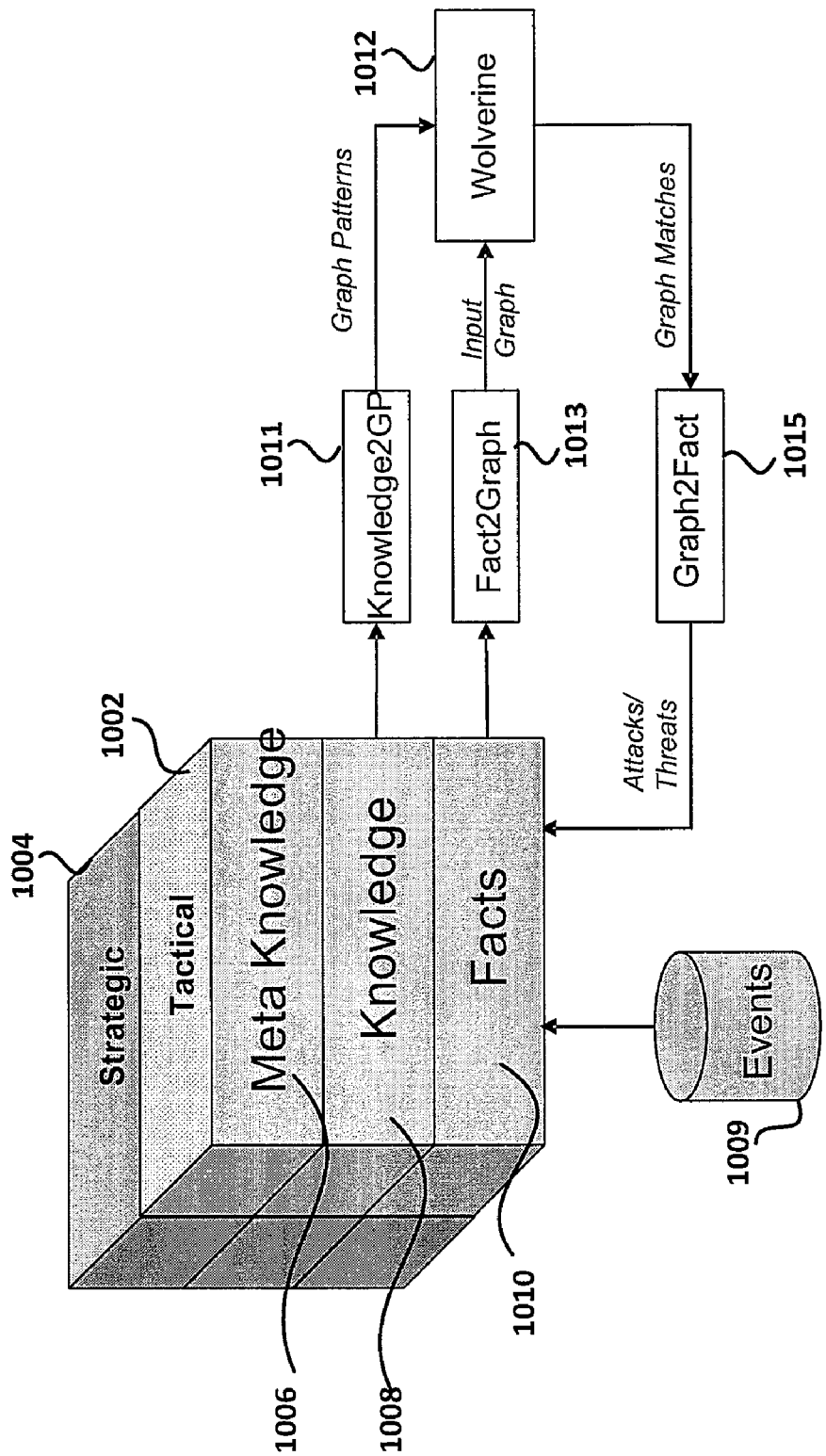
FIG. 10 is a block diagram representation of the exchange of knowledge and data between detected events an a specialize, highly efficient graph based data mining platform, in accordance with one embodiment of the invention.

Thus, the embodiment of FIG. 10 is provided in which Wolverine™ is provided to complete the operations within the database. Notably, by replacing the graph-based data miner 912 of FIG. 9 with Wolverine™ 1012, various enhancements to the NETWAR architecture are provided. The direction of flow of knowledge2graph 1011 and fact2graph 1013 are reversed, as is the directional flow of graph2fact 1015.

Figure 11:
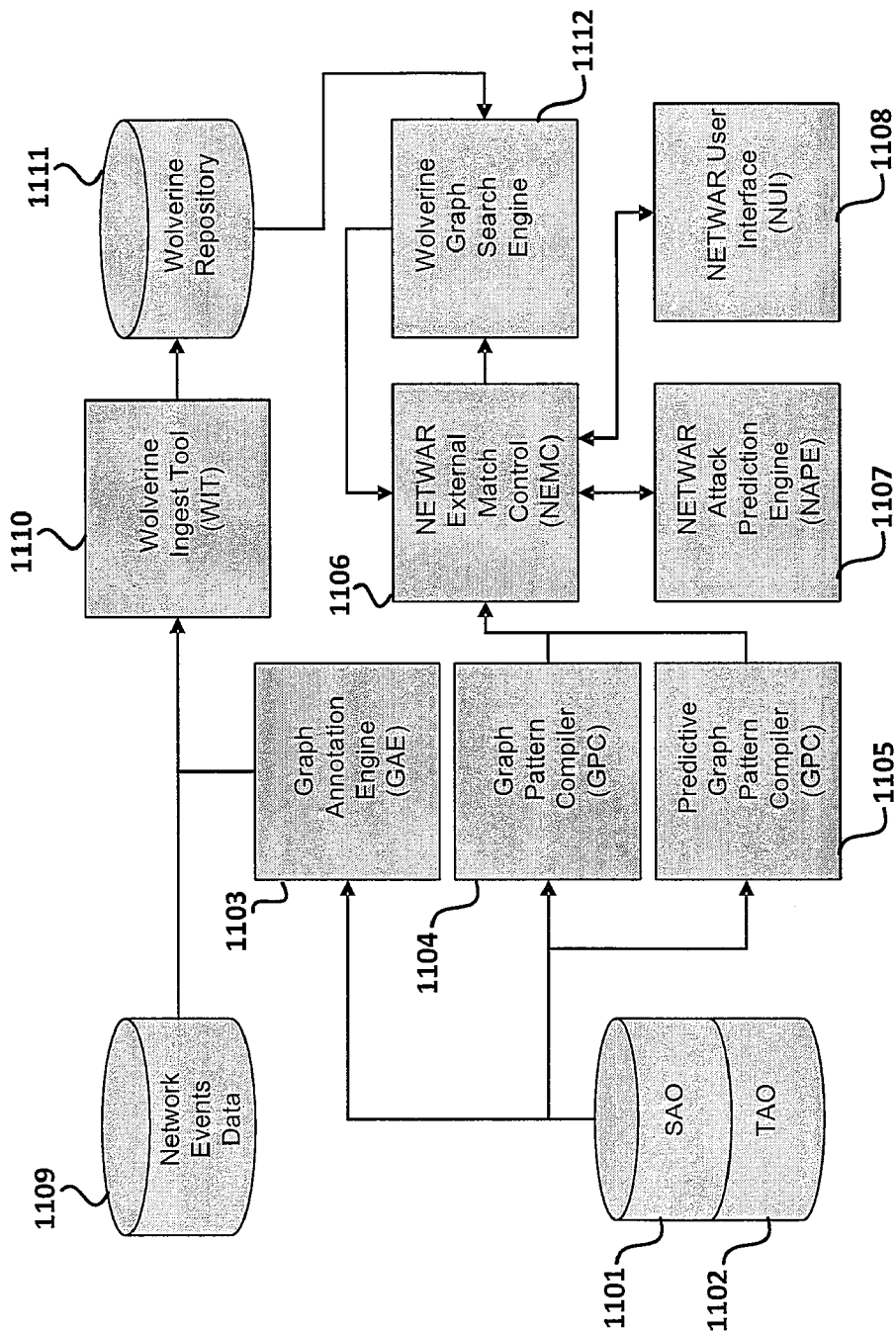
FIG. 11 is a high level block diagram of NETWAR architecture with components of a highly scalable graph searching engine, in accordance with one embodiment of the invention.

The interconnectivity of the components of Wolverine™ as the graph analysis tool within NETWAR is illustrated by FIG. 11, which provides a function-level diagram illustrating an example NETWAR architecture with the scalable functionality. NETWAR architecture 1100 comprises several interconnected functions/components, which include Statistical Attack Ontology (SAO) 1101 and Tactical Attack Ontology (TAO) 1102, both of which feed data into three graph-based components. These components include Graph Annotation Engine (GAE) 1103, Graph Pattern Complier (GPC) 1104, and Predictive Graph Pattern Compiler (Predictive GPC) 1105. The latter two components provide input data for NETWAR External Match Control (NEMC) 1106. NEMC 1106 communicates/interacts with NETWAR Attack Prediction Engine (NAPE) 1107 and is accessible via NETWAR user interface (NUI) 1108.

The NETWAR architecture 1100 also comprises an interface with a network events database 1109, which provides data utilized by Wolverine Ingest Tool (WIT) 1110. WIT 1110 also receives input from GAE 1103 and forwards generated output data to Wolverine Repository 1111, which feeds into Wolverine Graph Search Engine 1112. Wolverine Graph Search Engine 1112 and NEMC 1106 exchange data and other information (e.g., pattern matches) and enable the graph matching functions described herein. Several of the key components illustrated within FIG. 11 are now described in greater detail.

1. Tactical and Strategic Attack Pattern Libraries (Ontology)

NETWAR provides the analyst or user with the ability to create a library of tactical attack patterns and store these patterns in a Tactical Attack Ontology (TAO) 1102. The TAO 1102 comprises these attack patterns, as well as patterns used in verification and validation. Additional patterns may also be developed for the TAO 1102, using input from subject matter experts (SMEs) within the target. Additionally, NETWAR provides the analyst with a library of strategic attack patterns, which are store in the Strategic Attack Ontology (SAO) 1101. The SAO 1101 is further extended to hold strategic threat patterns. As with tactical attack patterns, strategic patterns are developed in the SAO 1101, using input from subject matter experts (SMEs) within the network of interest. Also, ontological concepts are added to the SAO as needed to support strategic pattern definitions.

Figure 5:
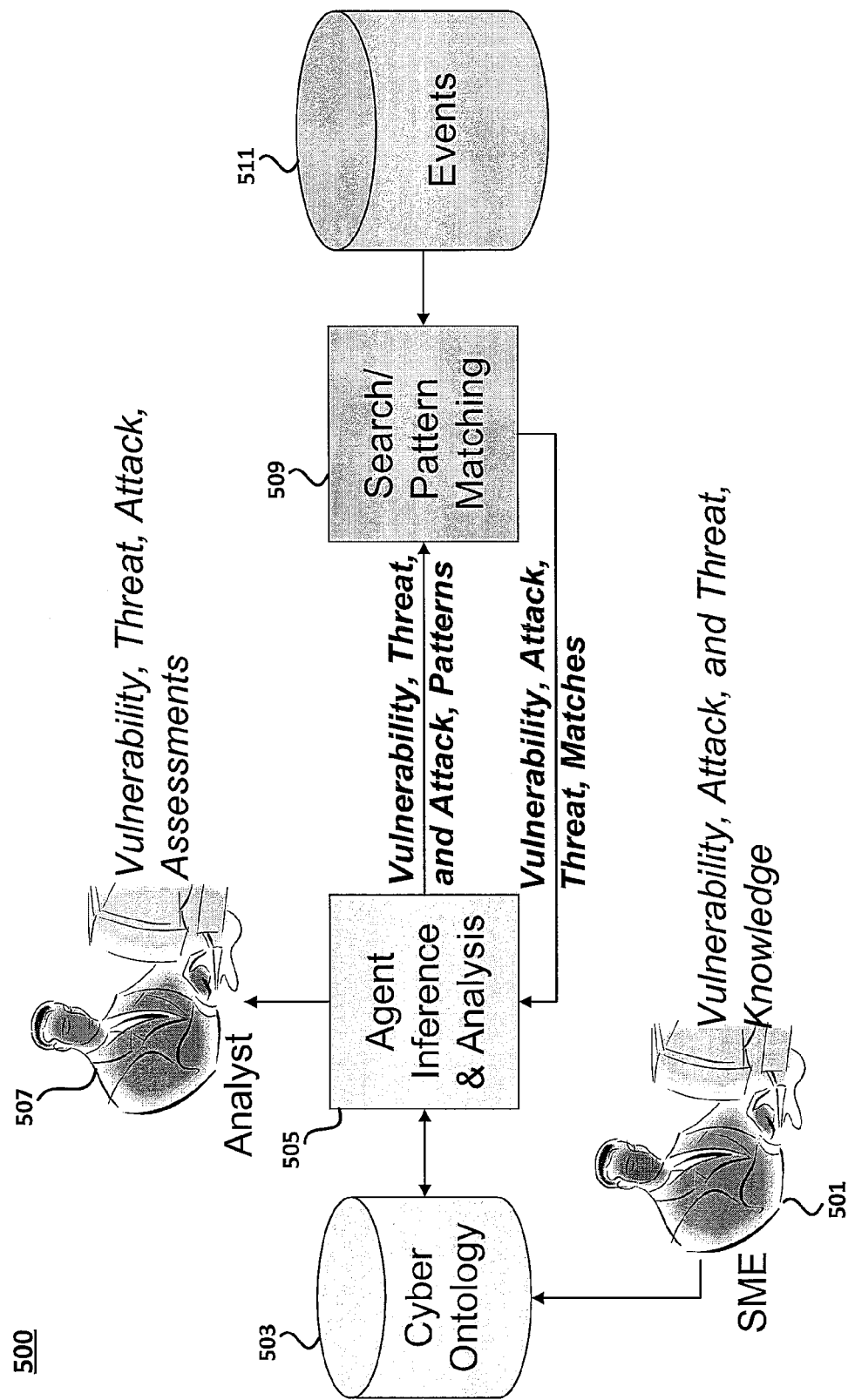
FIG. 5 is an example system for generation and updating by subject matter experts and analysts of the cyber ontology used for attack pattern detection within NETWAR, in accordance with one embodiment of the invention.

FIG. 5 is a very high level connectivity diagram illustrating the connection between subject matter experts (SMEs) and an analyst in generating, developing and using cyber ontology for performing pattern matching within NETWAR. As shown, SME 501 provides knowledge about vulnerability, attacks and threats to a cyber ontology 503 (i.e., a database of ontologies). Cyber ontology holds a plurality of attack patterns, which are utilized to identify or predict attacks. The information within cyber ontology 503 is passed to an agent inference and analysis application 505 (e.g., a function within TSADaP utility) by which an analyst is able to perform assessments of the vulnerabilities, threat and attacks identified by the specific ontology. These ontologies are forwarded to search/pattern matching engine 509 as vulnerability, threat and/or attack patterns. The search and pattern matching engine 509 receives events from event database 511, and these events are utilized to generate an input graph utilized by search/pattern matching engine 509. When matches of the patterns (representing the ontologies) are found, search/pattern matching engine 509 passes the results of those matches back to agent inference and analysis application 505, which passes the information about the matches of the ontology (vulnerabilities, threats and attacks) to analyst 507 for further assessment. Also, as matches to the ontology are detected, agent inference and analysis application 505 provides updates to the cyber ontology 503.

2. NETWAR External Match Control (NEMC) and NETWAR User Interface

In one embodiment, NETWAR External Match Control (NEMC) 1106 is provided to manage graph search and to analyze the threat, attack, and forensic matches that are returned. The NEMC 1106 provides a set of commonly desired controls for filtering matches (e.g., based on time, novelty, or specific characteristics, for example), assigning and managing the priority of matches, and for reconciling partial matches across successive search iterations. Additionally the NEMC 1106 supports automated actions for gathering additional evidence (e.g., retrieving the transcripts of one or more communications sessions), for outputting or transmitting match results to a particular system or individual, and for any other purpose deemed feasible and necessary for streamlining the workflow of personnel for the target entity. Finally the NEMC 1106 supports follow-up searches with scoped parameters for automating the secondary and tertiary steps of investigation of a specific incident. In one embodiment, each of these controls are configurable by analysts through the NETWAR user interface, so the controls are able to incrementally improve the effectiveness and efficiency of their patterns and the information delivered in the search results. As a result, in one embodiment, the design and features of the NEMC 1106 depends heavily upon input from the analyst(s).

3. NETWAR User Interface

According to the provided embodiments, NETWAR also comprises a highly usable task-centered NETWAR user interface (NUI), which is based on the cognitive and task analysis performed by NETWAR. NUI 1108 is utilized by analyst and subject matter experts to view portion of the network, update the ontologies, and perform analyst functions within NETWAR, among other functions. An example NUI 800 is provided by FIG. 8, which illustrates visualization of one view of the input graph with specific ontologies defined. The task-centered user interface supports roles identified in the task analysis and employs visualization techniques to reduce cognitive load. NUI 1108 also includes features to support certain tasks within NETWAR, including the analyst interface to the NEMC and interfaces for tagging and configuring the contents and destination(s) of forensic analysis and threat analysis publications.

4. Extensions to Wolverine™ Graph Search Engine (GSE) and Wolverine™ Ingest Tools (WIT)

The Wolverine™ Graph Search Engine (GSE) compiles graph patterns to instructions that run on a graph-matching virtual machine. According to one embodiment, GSE is enhanced to support a subsumption-based reasoning, which is a key function in NETWAR data analysis. The extension of GSE includes enabling GSE to support NETWAR requirements for abstract threat patterns that require concept subsumption.

In one embodiment, every subsumable concept is matched to one or more strings representing the particular lineage(s) of the concept. With the concept lineages mapped to strings, the tests for subsumed concepts map directly into tests for specific lineage prefixes, which can be implemented as simple substring matches. In an alternative embodiment every subsumable concept is mapped to the set of concepts which subsume the concept. This latter embodiment can be achieved by pre-computing the transitive closure of the subsumption relation and then converting the test for subsumption into a test for an individual value of the subsumption relation.

Additionally, in one embodiment, the functionality of Wolverine's ingest tools are enhanced/extended to enable ingestion of network events data into the Wolverine™ repository. This extension provides the capability for Wolverine™ to efficiently construct Wolverine™ match diagrams (MDs) referencing specific rows and their interconnections within tables of the network events database. These MDs then provide for efficient search, sampling, and enumeration of interesting events and connections. The embodiment taps into functions within the foundational platform of Wolverine™, which provides the capability for efficiently searching generic database models.

The embodiments also recognize and address the requirement that, in order to harness its full scalability capacity, Wolverine™ requires its target data to be stored in a normalized graph form. Thus, in order to leverage the additional performance gains of a Wolverine graph search functionality, an "events data"-specific ingest module is provided, which operates to convert specific types of network events data in its standard form into the normalized graph form desired by Wolverine™. Thus, the implementation of the invention with the extensions to Wolverine's ingest module provides a scalable, efficient foundation for Wolverine™ search, upon which NETWAR is then able to complete its core functions efficiently.

5. Graph Pattern Generator (GPG) and Graph Annotation Engine (GAE)

In one embodiment, a graph pattern generator (GPG) is provided, which is utilized to convert NETWAR's current and future ontology-based patterns into the precise pattern query language (PQL) supported by Wolverine™. Also, in order to support the desired predictive functions of NETWAR, the GPG decomposes the complete threat patterns stored in the ontology into meaningful time-based sub-patterns that will match sequences of activity that are precursors to becoming a significant threat.

Wolverine™ distinguishes between the pattern specification in PQL, which describes the characteristics of the desired matches, and the sequence of Wolverine™ operations that locate such matches. The Wolverine™ platform may itself include a generic search planner, which typically identifies a valid, efficient search plan for generic patterns. However, with the sub-pattern decomposition of the GPG and other extensions/enhancements to the Wolverine™ graph search engine, the GPG is utilized to generate an optimal search plan. The GPG serves to ensure that the generated search plan is optimal or, when necessary, is tweaked to be optimal, given the GPG's knowledge of the general structure of the type of events data, as well as its awareness of the relationship of the patterns to be executed.

In one embodiment, the GAE is provided to ensure that network events data is in an efficiently searchable form. GAE supports arbitrary annotations at graph creation. Such annotations will include transformation of any static field values, such as event types and matched strings, into the equivalent ontological values, in order to enable the subsumption reasoning capability required. Additional annotations enable the incorporation of other static information describing the hosts or traffic on the network. This static information may include information about the network topology and host configuration, where available, and characterizations of any specialized ports or traffic specific to the networks of interest. More generally, these annotations may include any other static or graph-specific knowledge upon which an analysts desires to search.

In one embodiment, the GAE is responsible for creating input graphs in the graph analysis tool's repository that are consistent with the patterns for the graph analysis tool compiled by the GAE. By separating the module ensuring consistency (i.e. the GAE) from the events data ingest module, NETWAR patterns will be more adaptable to future ontology revisions, thereby making the events data more amenable to augmentation with outside information and more amenable to executing the queries desired by network analysts.

6. NETWAR Publishing Capability

NETWAR also provides the ability to publish forensic data to a pre-specified output target based on pre-established/specified requirements of the client (i.e., the user of NETWAR or entity for which NETWAR is being run). NEMC includes the ability to match results to a particular system or individual. In one embodiment, NETWAR also supports publishing this data along with data points tagged as relevant by analysts in a single forensic data package. The package is publishable in one or more standardized formats to support integration into existing systems or processes in use by the client or external data consumers of the client. In one embodiment, identification of the particular desired format(s) will require input from the client's personnel.

In one embodiment, NETWAR is designed with the capability to publish threat analysis data to subscribers within the client(s). Such threat analysis data may include forensic analysis packages of multiple correlated incidents, as well as particular metrics gathered or computed by other NETWAR analysis components that demonstrate the characteristics of multiple observed incidents and their relationship(s) to the suspected threat. Similar to forensic analysis publication, each threat analysis package is publishable in one or more standardized formats to facilitate integration into existing systems or processes in use by the client or the client's external data consumers.

In another embodiment, NETWAR provides support for sequencing data points by time and converting the sequenced data points into textual descriptions of network activity. Thus, with this functionality, NETWAR provides the capability of telling the "story" of a particular incident, with reference to data points that may be inaccessible to a particular audience.

7. NETWAR Method and Process

Figure 12:
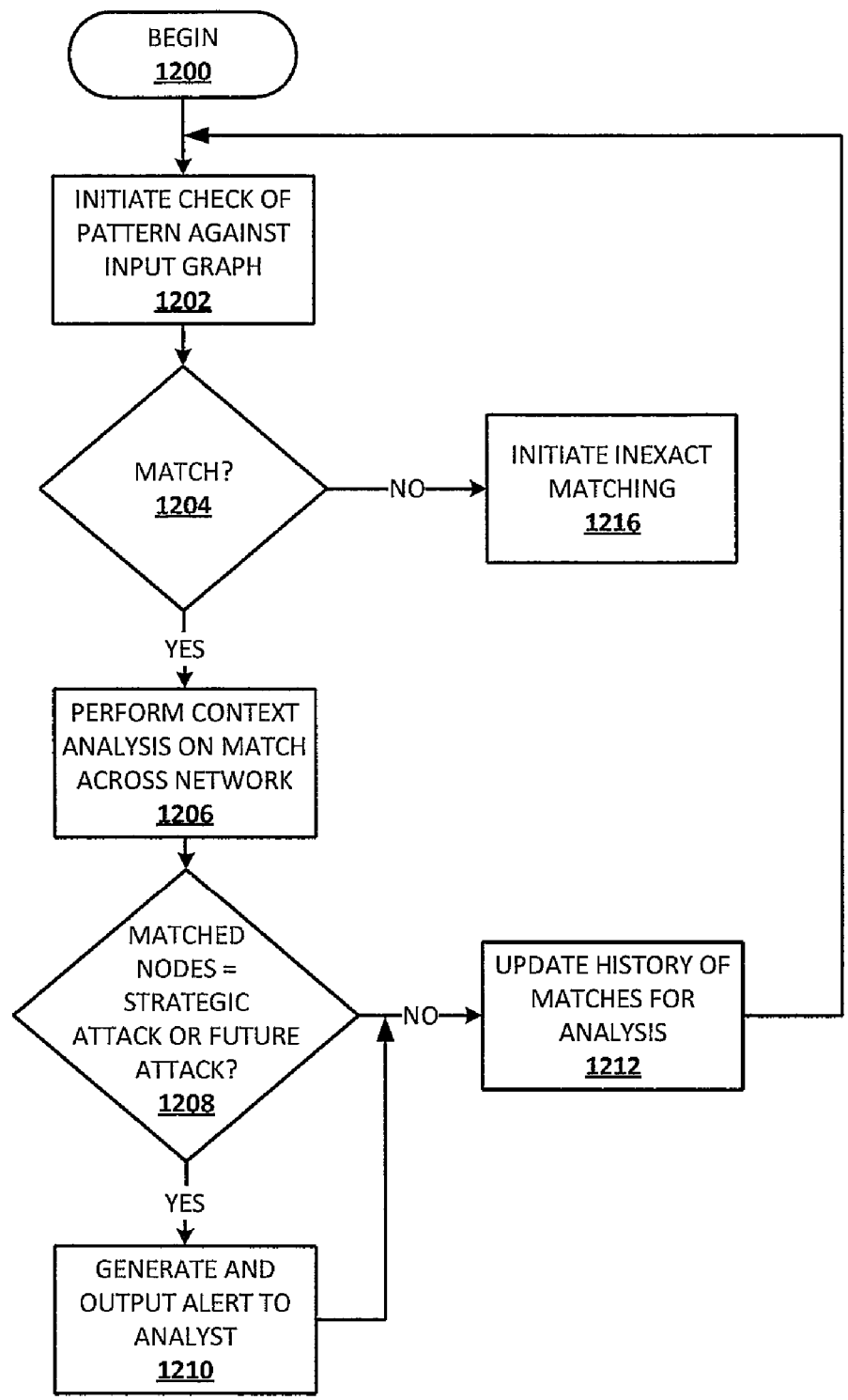
FIG. 12 is a high level flow chart illustrating the method by which illustrating the method by which events/activities within a network are identified, matched to a pattern graph, and determined to be associated with a current or future-predicted strategic attack on the network, in accordance with one embodiment of the invention.

FIG. 12 is a flow chart of the method of operation of the NETWAR architecture, in accordance with the described embodiments of the present invention. The described processes are completed by TSADaP utility executing within NETWAR device and utilizing a scalable graph analysis tool, such as Wolverine, to complete the graph searching and other associated graph-related functions. The method begins at block 1200 (with activation of NETWAR) and proceeds to block 1202 at which the utility initiates a check of the pattern graph against the input graph. This initiation may be in response to a user input within NUI 1108. A check is made whether a match of the graph pattern is detected within the input graph, as shown at decision block 1204. If a match is found, the utility performs a context analysis on the match relative to other detected or known occurrences on the overall network, as depicted at block 1206. The context analysis enables identification of strategic attacks. A next determination is made at block 1208, whether the matched pattern of activity represents activity related to an (ongoing or future) strategic attack. If the matched node(s) is determined to be an activity within/indicating a strategic attack on the network, the utility generates an appropriate alert, which is forwarded to the analyst, as provided at block 1210. However, if the matched pattern does not represent/indicate a strategic attack, the match is updated within the history of matches (as a false-positive match) at block 1212 and the process returns to block 1202 and the process iterates until stopped by the analyst (or some other time-out condition).

Returning now to decision block 1204, if no complete match of the pattern is detected, the utility triggers activation of inexact matching, as shown at block 1216. Of course, it is appreciated that the inexact matching process may actually proceed simultaneously with the regular analysis for a complete match. The analyst predefines the level of exactness required (e.g., 80% match) or level of inexactness accepted (e.g., 20%), and the initial search may be performed for any matches that meet this criteria.

Figure 13:
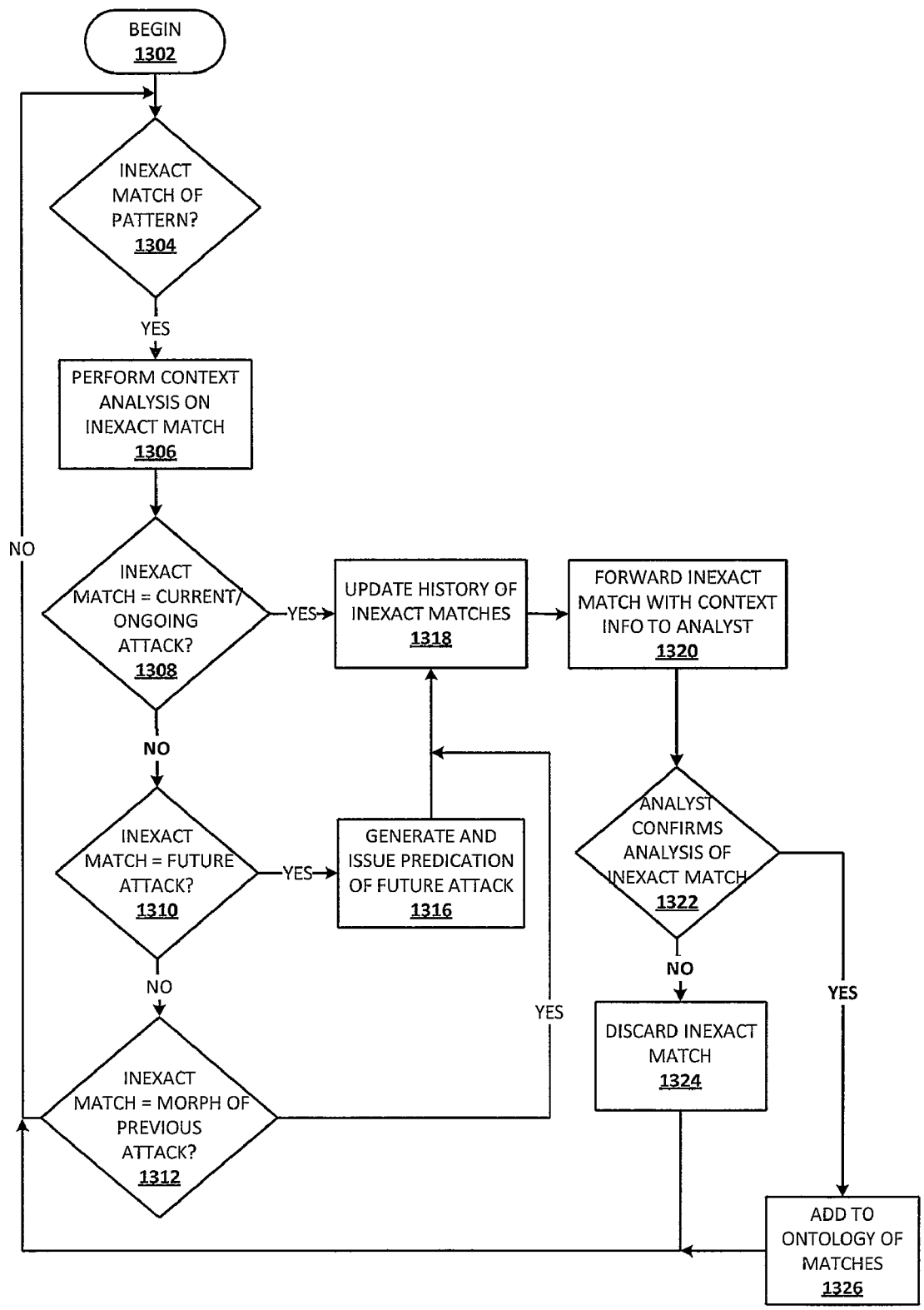
FIG. 13 illustrates the method of performing inexact matching and predicting future attacks, according to one embodiment of the invention.

FIG. 13 illustrates the method of performing inexact matching and predicting future attacks, according to one embodiment. The process begins at block 1302, similar to block 1200 (FIG. 12) and follows with a check of the pattern graph against the input graph with a pre-set "inexactness" criteria established. During the inexact matching analysis process, a determination is made at block 1304 whether an inexact match of the provided graph patterns (from the ontology) is found. If no inexact match is found, the process returns to block 1304 and iterates until stopped by the analyst (or some other time-out condition). However, if an inexact match is found, the utility triggers another series of processes/checks to determine what the inexact match represents.

As shown at block 1306, the utility performs a context analysis on the inexact pattern match, and then a determination is made at block 1308 whether the inexact match indicates/suggests the occurrence of a current or ongoing or failed strategic attack. Assuming the inexact match does not indicate a current/ongoing/failed attack, a next determination is made at block 1310 whether the inexact match indicates/suggests a future attack. With the inexact match indicating a prediction of a future attack, an alert of the future attack is generated and issued, as shown at block 1316. If the inexact match does not indicate a future attack, a final determination is made at block 1312 whether the inexact match indicates morphing of a previous attack pattern. Assuming the inexact match is not determined to be any of the above types of attack patterns, then the process iterates until terminated.

However, when the inexact match equates to any one of the above types of attack patterns, the process proceeds to block 1318 at which a history of inexact matches found is updated to include the inexact match. Following the update of the history table of inexact matches, the information related to the inexact match including the context information is forwarded to the analyst, as shown at block 1320. The analyst then reviews the information received and a check is made at block 1322 whether the analyst confirms the inexact match as a current/ongoing/failed, future, or morphed attack pattern. When the analyst fails to confirm the inexact match as one of relevance/concern, the match is discarded at block 1324 and the process iterates until terminated. If the analyst confirms the inexact match is one of the three types of inexact matches of relevance/concern, the analyst adds the inexact match to the strategic attack ontology (SAO) database at block 1326.

In the flow charts above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As described above, NETWAR is an agile system capable of rapidly analyzing terabytes of data for sophisticated (as well as simple) attacks. NETWAR enables detection of real-time threat occurrences as well as "low and slow" network reconnaissance is essential as is the requirement to have greater, near real time analytical depth and predictive capability to network event data. NETWAR capability is intended to reduce the workload of operators, improve the quality and timeliness of reporting, provide forensic and predictive capabilities, and thus more effectively prosecute the network defensive missions of analysts.

As will be further appreciated, the processes in preferred embodiments of the present invention may be implemented using any combination of software, firmware or hardware. As a preparatory step to practicing the invention in software, the processor programming code (whether software or firmware) according to a preferred embodiment will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution. The method form of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

As a final matter, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. Examples of such media include recordable type media (or storage media) such as floppy disks, hard disk drives, CD ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method comprising:
   receiving input data representing activities and events on a network;
   detecting tactical attacks against one or more entities by analyzing the input data;
   dynamically determining when the one or more tactical attacks are indicative of a strategic attack; and
   matching strategic attack graph patterns against an input graph representing the relationships and affiliations among the entities and the tactical attacks the entities have been victim to, in order to determine a strategic significance of detected tactical attacks.

2. The method of claim 1, wherein said dynamically determining comprises:
   evaluating a strategic motive, tactical means, and tactical opportunities (MMO) of a potential attacker by detecting one or more strategic actions within the input data, which identify the strategic attack; and
   fingerprinting the MMO for future detection of similar strategic attacks, said MMO identifying reconnaissance and attack activities.

3. The method of claim 2, wherein:
   said identifying of reconnaissance and attack activities involves accessing one or more automated reconnaissance tools, including open access and online tools and tools designed for supporting strategic attack detection to identify information vulnerabilities;
   said method further comprising:
   observing, via the online tools, intelligence gathering, planning, testing, and collaboration activities performed on the network; and
   generating multiple MMOs based on observed, known, and deduced attack and reconnaissance patterns.

4. The method of claim 1, wherein said dynamically determining further comprises:
   when an entity that may potentially be attacked has vulnerabilities outside of the entity's own network, extrapolating beyond a network of the entity being attacked to enable detection of strategic attacks in a supply chain and other domains of affiliated entities.

5. The method of claim 1, further comprising:
   generating a user interface for enabling input, manipulation and control of information and data utilized during the dynamically determining step; and
   outputting results of said dynamically determining step via the user interface.

6. The method of claim 1, further comprising:
   forwarding information related to a detected strategic attack to an analyst for evaluation; and
   enabling analyst input in assessing a level of seriousness of a detected strategic attack.

7. The method of claim 1, further comprising detecting supply chain attacks and technology-based attacks directed at a target system via an intermediary entity.

8. The method of claim 1, further comprising:
   analyzing the detected tactical attacks and strategic attacks;

predicting possible occurrences of a future attack based on said analyzing a known context for precipitating said future attacks; and outputting an alert about the predicted future attacks.

9. The method of claim 1, further comprising performing strategic attack detection within an in-memory graph search function, having a display architecture in which the set of all graph elements is known and available.

10. A method comprising:

receiving input data representing activities and events on a network;

detecting tactical attacks against one or more entities by analyzing the input data; dynamically determining when the one or more tactical attacks are indicative of a strategic attack; and correlating events from multiple sensors throughout the network to understand tactical attacks, wherein said correlating is completed via one or more graph analysis engines (GAEs) and includes detecting ongoing tactical attacks, performing forensics on completed tactical attacks, and predicting likely conclusions to ongoing attacks.

11. The method of claim 10, further comprising:

receiving, via the GAE, input data from data sources/sensors; and performing a data fusion on the input data utilizing a domain ontology to fuse the input data into an Attributed Relational Graph (ARG);

wherein the GAE utilizes the domain ontology to (1) map sensor events to probable actions, (2) define threat patterns, and (3) provide ontological services to the pattern matcher.

12. A method comprising:

receiving input data representing activities and events on a network;

detecting tactical attacks against one or more entities by analyzing the input data;

dynamically determining when the one or more tactical attacks are indicative of a strategic attack;

generating an input graph representing the input data;

sampling and evaluating the input data using a graph-based search engine;

performing graph matching, anomaly detection and social network analysis within the input graph to determine presence in the input graph of tactical and strategic attack patterns; and dynamically determining a strategic motive, tactical means, and tactical opportunities (MMO) of an attacker; and automatically detecting and predicting strategic attacks by detecting strategic actions identified within the input graph and comprehending the MMO of the potential attacker.

13. A method comprising:

receiving input data representing activities and events on a network;

detecting tactical attacks against one or more entities by analyzing the input data;

dynamically determining when the one or more tactical attacks are indicative of a strategic attack;

enabling creation of an ontology of example attack patterns that represent known and potential attack patterns; and enabling updates of the ontology to include newly detected attack patterns and remove patterns that are no longer classified as attack patterns.

14. The method of claim 13, wherein said enabling creation further comprises:

storing graph patterns that identify tactical attacks within the network in a tactical attack ontology; and storing graph patterns that identify strategic attacks within the network in a strategic attack ontology;

wherein said strategic attack ontology is cyber ontology including network vulnerability, network attacks and network threats.

15. A method comprising:

receiving input data representing activities and events on a network;

detecting tactical attacks against one or more entities by analyzing the input data;

dynamically determining when the one or more tactical attacks are indicative of a strategic attack;

establishing a sensitivity cutoff, which indicates a match percentage less than a complete match desired to determine when a detected pattern is a likely candidate as an attack pattern;

performing an inexact matching search utilizing said sensitivity cutoff;

when an inexact match is identified, evaluating if the inexact match is a match of one of a current attack, a future attack, and a failed attack;

predicting a likely outcome of an ongoing attacks by analyzing partial matches of attack patterns, wherein, if a predicted attack step in the attack pattern is not observed over a pre-established time, the attack is assumed to have failed;

when the inexact match is identified as one of a current attack, a future attack and a failed attack, updating a history table of inexact matches and forwarding the inexact match along with corresponding context information for review;

when the inexact match is confirmed by an analyst as an attack, updating the ontology of attack patterns to include the inexact match; and when the inexact match indicates a possible future predicted attack, generating an alert predicting the future attack.

16. The method of claim 15, further comprising:

when the inexact match is within a pre-set variance for the sensitivity cutoff:

tagging the sequence of activities as a potential attack;

monitoring subsequent activity to determine if the potential attack evolves into an actual attack; and updating the ontology with a morphed attack pattern when the inexact match is determined to be an attack.

17. The method of claim 16, further comprising:

automatically accounting for evolving changes in attack pattern to enable detection of evolving attack patterns, wherein an evolved attack pattern is detected without requiring a full attack signature from input graph comparison.

18. A method comprising:

receiving input data representing activities and events on a network;

detecting tactical attacks against one or more entities by analyzing the input data;

dynamically determining when the one or more tactical attacks are indicative of a strategic attack;

storing the input data to a scalable database capable of managing a large amount of data at a time;

monitoring the network in real time;

updating the scalable database with new input data generated from the network; and performing the analysis of the input data for detection of strategic attacks via a database graph search functionality of a graph analysis tool capable of retrieving graph elements directly from the scalable database and providing direct queries to the input graph provided within the scalable database;

wherein a clear separation of threat semantics and graph search functions for attack patterns is provided.

19. The method of claim 18, further comprising:

converting ontology-based patterns into a precise pattern query language (PQL) supported by the graph analysis tool; and decomposing complete attack patterns stored in the strategic attack ontology into meaningful time-based sub-patterns that will match sequences of activity that are precursors to becoming a significant attack threat, wherein said decomposing enables a predictive capability for future attacks.

20. A method comprising:

receiving input data representing activities and events on a network;

detecting tactical attacks against one or more entities by analyzing the input data;

dynamically determining when the one or more tactical attacks are indicative of a strategic attack;

sequencing input data points by time; and converting the sequenced input data points into textual descriptions of network activity.

21. A method comprising:

receiving input data representing activities and events on a network;

detecting tactical attacks against one or more entities by analyzing the input data;

dynamically determining when the one or more tactical attacks are indicative of a strategic attack;

providing fusion of data at a strategic level, wherein said fusion accounts for inputs from Internet sensors, open sources, and search engine statistics, wherein the strategic level fusion utilizes a business threat ontology and strategic level GAEs to understand strategic attacks;

wherein the business threat ontology associated with strategic level GAEs contain one or more of: (1) descriptions of specifically identified target entities; (2) interdependencies between the individual target entities, including as supply chain dependencies; (3) business functions and services of the target entities; (4) relationships between the network assets and business assets of the target entities, including strategic information, functions, and services; and (5) information about strategic threats and the threat's likely motives;

wherein the strategic level fusion provides attack patterns for one or more of: (1) supply chain availability attacks; (2) industrial espionage focused on exfiltration of information about specific technologies; and (3) strategic infiltration of an infrastructure to be leveraged in the future.

22. A computer program product comprising:

a computer readable medium; and program code on the computer readable medium that when executed by a processor provides the functions of:

receiving input data representing activities and events on a network;

detecting tactical attacks against one or more entities by analyzing the input data;

dynamically determining when the one or more tactical attacks are indicative of a strategic attack;

matching strategic attack graph patterns against an input graph representing the relationships and affiliations among the entities and the tactical attacks the entities have been victim to, in order to determine a strategic significance of detected tactical attacks; and correlating events from multiple sensors throughout the network to understand tactical attacks, wherein said correlating is completed via one or more graph analysis engines (GAEs) and includes detecting ongoing tactical attacks, performing forensics on completed tactical attacks, and predicting likely conclusions to ongoing attacks.

23. The computer program product of claim 22, wherein said code for dynamically determining comprises code for:

evaluating a strategic motive, tactical means, and tactical opportunities (MMO) of a potential attacker by detecting one or more strategic actions within the input data, which identify the strategic attack; and fingerprinting the MMO for future detection of similar strategic attacks, said MMO identifying reconnaissance and attack activities.

24. The computer program product of claim 23, wherein:

said code for identifying of reconnaissance and attack activities comprises code for accessing one or more automated reconnaissance tools, including open access and online tools and tools designed for supporting strategic attack detection to identify information vulnerabilities;

said program code further comprising code for:

observing, via the online tools, intelligence gathering, planning, testing, and collaboration activities performed on the network; and generating multiple MMOs based on observed, known, and deduced attack and reconnaissance patterns.

25. The computer program product of claim 22, further comprising code for:

receiving, via the GAE, input data from data sources/sensors; and performing a data fusion on the input data utilizing a domain ontology to fuse the input data into an Attributed Relational Graph (ARG);

wherein the GAE utilizes the domain ontology to (1) map sensor events to probable actions, (2) define threat patterns, and (3) provide ontological services to the pattern matcher.

26. The computer program product of claim 22, wherein said code for dynamically determining further comprises code for:

when an entity that may potentially be attacked has vulnerabilities outside of the entity's own network, extrapolating beyond a network of the entity being attacked to enable detection of strategic attacks in a supply chain and other domains of affiliated entities.

27. The computer program product of claim 22, further comprising code for:

analyzing the detected tactical attacks and strategic attacks;

predicting possible occurrences of a future attack based on said analyzing a known context for precipitating said future attacks; and outputting an alert about the predicted future attacks.

28. A computer program product comprising:

a computer readable medium; and program code on the computer readable medium that when executed by a processor provides the functions of:

receiving input data representing activities and events on a network;

detecting tactical attacks against one or more entities by analyzing the input data; dynamically determining when the one or more tactical attacks are indicative of a strategic attack;

establishing a sensitivity cutoff, which indicates a match percentage less than a complete match desired to determine when a detected pattern is a likely candidate as an attack pattern;

performing an inexact matching search utilizing said sensitivity cutoff;

when an inexact match is identified, evaluating if the inexact match is a match of one of a current attack, a future attack, and a failed attack;

predicting a likely outcome of an ongoing attacks by analyzing partial matches of attack patterns, wherein, if a predicted attack step in the attack pattern is not observed over a pre-established time, the attack is assumed to have failed;

when the inexact match is identified as one of a current attack, a future attack and a failed attack, updating a history table of inexact matches and forwarding the inexact match along with corresponding context information for review;

when the inexact match is confirmed by an analyst as an attack, updating the ontology of attack patterns to include the inexact match;

when the inexact match indicates a possible future predicted attack, generating an alert predicting the future attack.

29. The computer program product of claim 28, further comprising code for:

when the inexact match is within a pre-set variance for the sensitivity cutoff:
tagging the sequence of activities as a potential attack;
monitoring subsequent activity to determine if the potential attack evolves into an actual attack; and
updating the ontology with a morphed attack pattern when the inexact match is determined to be an attack.

30. A computer program product comprising:
a computer readable medium; and
program code on the computer readable medium that when executed by a processor provides the functions of:
receiving input data representing activities and events on a network;
detecting tactical attacks against one or more entities by analyzing the input data; dynamically determining when the one or more tactical attacks are indicative of a strategic attack;
storing the input data to a scalable database capable of managing a large amount of data at a time;
monitoring the network in real time;
updating the scalable database with new input data generated from the network; and
performing the analysis of the input data for detection of strategic attacks via a database graph search functionality of a graph analysis tool capable of retrieving graph elements directly from the scalable database and providing direct queries to the input graph provided within the scalable database;
wherein a clear separation of threat semantics and graph search functions for attack patterns is provided.

31. A computer program product comprising:
a computer readable medium; and
program code on the computer readable medium that when executed by a processor provides the functions of:
receiving input data representing activities and events on a network;
detecting tactical attacks against one or more entities by analyzing the input data; dynamically determining when the one or more tactical attacks are indicative of a strategic attack;
converting ontology-based patterns into a precise pattern query language (PQL) supported by the graph analysis tool; and
decomposing complete attack patterns stored in the strategic attack ontology into meaningful time-based sub-patterns that will match sequences of activity that are precursors to becoming a significant attack threat, wherein said decomposing enables a predictive capability for future attacks.

32. A computer program product comprising:
a computer readable medium; and
program code on the computer readable medium that when executed by a processor provides the functions of:
receiving input data representing activities and events on a network;
detecting tactical attacks against one or more entities by analyzing the input data; dynamically determining when the one or more tactical attacks are indicative of a strategic attack;
providing fusion of data at a strategic level, wherein said fusion accounts for inputs from Internet sensors, open sources, and search engine statistics, wherein the strategic level fusion utilizes a business threat ontology and strategic level GAEs to understand strategic attacks;
wherein the business threat ontology associated with strategic level GAEs contain one or more of: (1) descriptions of specifically identified target entities; (2) inter-dependencies between the individual target entities, including as supply chain dependencies; (3) business functions and services of the target entities; (4) relationships between the network assets and business assets of the target entities, including strategic information, functions, and services; and (5) information about strategic threats and the threat's likely motives;
wherein the strategic level fusion provides attack patterns for one or more of: (1) supply chain availability attacks; (2) industrial espionage focused on exfiltration of information about specific technologies; and (3) strategic infiltration of an infrastructure to be leveraged in the future.

33. A system comprising:
a processor;
a memory coupled to the processor; and
a utility, which executes on the processor to provide the functions of:
receiving input data representing activities and events on a network;
detecting tactical attacks against one or more entities by analyzing the input data;
dynamically determining when the one or more tactical attacks are indicative of a strategic attack;
matching strategic attack graph patterns against an input graph representing the relationships and affiliations among the entities and the tactical attacks the entities have been victim to, in order to determine a strategic significance of detected tactical attacks; and
correlating events from multiple sensors throughout the network to understand tactical attacks, wherein said correlating is completed via one or more graph analysis engines (GAEs) and includes detecting ongoing tactical attacks, performing forensics on completed tactical attacks, and predicting likely conclusions to ongoing attacks.

34. The system of claim 33, wherein said code for dynamically determining comprises code for:
   evaluating a strategic motive, tactical means, and tactical opportunities (MMO) of a potential attacker by detecting one or more strategic actions within the input data, which identify the strategic attack; and
   fingerprinting the MINMO for future detection of similar strategic attacks, said MMO identifying reconnaissance and attack activities.

35. The system of claim 34, wherein:
   said code for identifying of reconnaissance and attack activities comprises code for accessing one or more automated reconnaissance tools, including open access and online tools and tools designed for supporting strategic attack detection to identify information vulnerabilities;
   said utility further comprising code for:
      observing, via the online tools, intelligence gathering, planning, testing, and collaboration activities performed on the network; and
      generating multiple MMOs based on observed, known, and deduced attack and reconnaissance patterns.

36. The system of claim 33, wherein said code for dynamically determining further comprises code for:
   when an entity that may potentially be attacked has vulnerabilities outside of the entity's own network, extrapolating beyond a network of the entity being attacked to enable detection of strategic attacks in a supply chain and other domains of affiliated entities.

37. The system of claim 33, said utility further comprising code for:
   analyzing the detected tactical attacks and strategic attacks;
   predicting possible occurrences of a future attack based on said analyzing a known context for precipitating said future attacks; and
   outputting an alert about the predicted future attacks.

38. The system of claim 33, wherein said utility further comprises code for:
   generating a highly usable thin client user interface; and
   publishing forensic analysis and indications and warnings.

39. A system comprising:
   a processor;
   a memory coupled to the processor; and
   a utility, which executes on the processor to provide the functions of:
      receiving input data representing activities and events on a network;
      detecting tactical attacks against one or more entities by analyzing the input data;
      dynamically determining when the one or more tactical attacks are indicative of a strategic attack; and
      correlating events from multiple sensors throughout the network to understand tactical attacks, wherein said correlating is completed via one or more graph analysis engines (GAEs) and includes detecting ongoing tactical attacks, performing forensics on competed tactical attacks, and predicting likely conclusions to ongoing attacks;
      receiving, via the GAE, input data from data sources/sensors; and
      performing a data fusion on the input data utilizing a domain ontology to fuse the input data into an Attributed Relational Graph (ARG);
   wherein the GAE utilizes the domain ontology to (1) map sensor events to probable actions, (2) define threat patterns, and (3) provide ontological services to the pattern matcher.

40. A system comprising:
   a processor;
   a memory coupled to the processor; and
   a utility, which executes on the processor to provide the functions of:
      receiving input data representing activities and events on a network;
      detecting tactical attacks against one or more entities by analyzing the input data;
      dynamically determining when the one or more tactical attacks are indicative of a strategic attack;
      establishing a sensitivity cutoff, which indicates a match percentage less than a complete match desired to determine when a detected pattern is a likely candidate as an attack pattern;
      performing an inexact matching search utilizing said sensitivity cutoff;
      when an inexact match is identified, evaluating if the inexact match is a match of one of a current attack, a future attack, and a failed attack;
      predicting a likely outcome of an ongoing attacks by analyzing partial matches of attack patterns, wherein, if a predicted attack step in the attack pattern is not observed over a pre-established time, the attack is assumed to have failed;
      when the inexact match is identified as one of a current attack, a future attack and a failed attack, updating a history table of inexact matches and forwarding the inexact match along with corresponding context information for review;
      when the inexact match is confirmed by an analyst as an attack, updating the ontology of attack patterns to include the inexact match; and
      when the inexact match indicates a possible future predicted attack, generating an alert predicting the future attack.

41. The system of claim 40, said utility further comprising code for:
   when the inexact match is within a pre-set variance for the sensitivity cutoff:
      tagging the sequence of activities as a potential attack;
      monitoring subsequent activity to determine if the potential attack evolves into an actual attack; and
      updating the ontology with a morphed attack pattern when the inexact match is determined to be an attack.

42. A system comprising:
   a processor;
   a memory coupled to the processor; and
   a utility, which executes on the processor to provide the functions of:
      receiving input data representing activities and events on a network;
      detecting tactical attacks against one or more entities by analyzing the input data;
      dynamically determining when the one or more tactical attacks are indicative of a strategic attack;
      storing the input data to a scalable database capable of managing a large amount of data at a time;
      monitoring the network in real time;
      updating the scalable database with new input data generated from the network; and performing the analysis of the input data for detection of strategic attacks via a database graph search functionality of a graph analysis tool capable of retrieving graph elements directly from the scalable database and providing direct queries to the input graph provided within the scalable database;

wherein a clear separation of threat semantics and graph search functions for attack patterns is provided.

43. The system of claim 42, said utility further comprising code for:

converting ontology-based patterns into a precise pattern query language (PQL) supported by the graph analysis tool; and decomposing complete attack patterns stored in the strategic attack ontology into meaningful time-based sub-patterns that will match sequences of activity that are precursors to becoming a significant attack threat, wherein said decomposing enables a predictive capability for future attacks.

44. A system comprising;
a processor;
a memory coupled to the processor; and
a utility, which executes on the processor to provide the functions of:

receiving input data representing activities and events on a network;

detecting tactical attacks against one or more entities by analyzing the input data; dynamically determining when the one or more tactical attacks are indicative of a strategic attack;

providing fusion of data at a strategic level, wherein said fusion accounts for inputs from Internet sensors, open sources, and search engine statistics, wherein the strategic level fusion utilizes a business threat ontology and strategic level GAEs to understand strategic attacks;

wherein the business threat ontology associated with strategic level GAEs contain one or more of: (1) descriptions of specifically identified target entities; (2) interdependencies between the individual target entities, including as supply chain dependencies; (3) business functions and services of the target entities; (4) relationships between the network assets and business assets of the target entities, including strategic information, functions, and services; and (5) information about strategic threats and the threat's likely motives;

wherein the strategic level fusion provides attack patterns for one or more of: (1) supply chain availability attacks; (2) industrial espionage focused on exfiltration of information about specific technologies; and (3) strategic infiltration of an infrastructure to be leveraged in the future.

45. A system comprising:
a processor;
a memory coupled to the processor; and
a utility, which executes on the processor to provide the functions of:

receiving input data representing activities and events on a network;

detecting tactical attacks against one or more entities by analyzing the input data;

dynamically determining; when the one or more tactical attacks are indicative of a strategic attack;

a graph annotation engine that receives an input of strategic attack ontology and tactical attack ontology;

a graph pattern compiler and a predictive graph pattern compiler, which both receive an input of said strategic attack ontology and tactical attack ontology, wherein said pattern compilers provide an output to the external match control function;

an "events data"-specific ingest module, which operates to convert specific types of network events data in its standard form into the normalized graph form;

a graph analysis tool which provides a graph search engine for searching through the normalized graph form;

an external match control function; and
an attack prediction engine.

46. A system comprising;
a processor;
a memory coupled to the processor; and
a utility, which executes on the processor to provide the functions of:

receiving input data representing activities and events on a network;

detecting tactical attacks against one or more entities by analyzing the input data;

dynamically determining when the one or more tactical attacks are indicative of a strategic attack; and correlating events from multiple sensors throughout the network to understand tactical attacks, wherein said correlating is completed via one or more graph analysis engines (GAEs) and includes detecting ongoing tactical attacks, performing forensics on competed tactical attacks, and predicting likely conclusions to ongoing attacks;

further comprising a distributed network of GAEs utilized to capture data utilized to detect tactical attacks against target entities and evaluate a context and strategic significance of the tactical attacks.

* * * * *